United States Patent
Wei et al.

(10) Patent No.: US 10,582,502 B2
(45) Date of Patent: *Mar. 3, 2020

(54) TECHNIQUES FOR CONFIGURING UPLINK TRANSMISSIONS USING SHARED RADIO FREQUENCY SPECTRUM BAND

(71) Applicant: QUALCOMM Incorporated, San Diego, CA (US)

(72) Inventors: Yongbin Wei, La Jolla, CA (US); Durga Prasad Malladi, San Diego, CA (US); Tao Luo, San Diego, CA (US); Srinivas Yerramalli, San Diego, CA (US); Aleksandar Damnjanovic, Del Mar, CA (US); Hao Xu, Beijing (CN); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,534

(22) Filed: Jun. 5, 2019

(65) Prior Publication Data

US 2019/0289607 A1     Sep. 19, 2019

Related U.S. Application Data

(63) Continuation of application No. 15/837,463, filed on Dec. 11, 2017, now Pat. No. 10,362,575, which is a
(Continued)

(51) Int. Cl.
*H04W 72/02*     (2009.01)
*H04W 72/04*     (2009.01)
(Continued)

(52) U.S. Cl.
CPC ..... *H04W 72/0453* (2013.01); *H04L 27/2601* (2013.01); *H04W 72/0413* (2013.01); *H04W 72/1268* (2013.01); *H04W 74/0833* (2013.01)

(58) Field of Classification Search
CPC ... H04W 16/14; H04W 72/082; H04W 24/00; H04W 72/0453; H04W 88/06;
(Continued)

(56) References Cited

U.S. PATENT DOCUMENTS 8,626,172 B2    1/2014  Dravida et al.
9,867,187 B2    1/2018  Wei et al.
(Continued)

FOREIGN PATENT DOCUMENTS

CN    103430467 A    12/2013
CN    103580840 A    2/2014
(Continued)

OTHER PUBLICATIONS

Samsung: "Discussion on Overhead Reduction for UI DMRS for Small Cells," 3GPP Draft; R1-131022, 3GPP TSG-RAN WG1#72b, Apr. 19, 2013, URL: http://www.3gpp.org/ftp/tsg_ran/WG1_RL1/TSGR1_72b/Docs/R1-131022.zip, 1 page.
(Continued)

*Primary Examiner* — Dai Phuong
(74) *Attorney, Agent, or Firm* — Dalei Dong; Holland & Hart LLP

(57) ABSTRACT

Techniques for wireless communications over a shared radio frequency spectrum band, may include techniques for transmitting uplink data transmissions using allocated uplink resources. Allocated uplink resources may include an uplink channel comprising a number of allocated interlaces of resource blocks (RBs) for use by a user equipment (UE). An incoming data stream may be processed and data separated into each of the allocated interlaces of RBs for the UE. Such
(Continued)

separation may be through demultiplexing the data stream to obtain data for the allocated interlaces of RBs. The demultiplexed data may be mapped onto associated resource elements associated with the allocated interlaces of RBs, and transmitted. Different types of uplink channels, such as a physical uplink control channel (PUCCH), physical uplink shared channel (PUSCH) and/or a physical random access channel (PRACH) may be allocated to interlaces of RBs in one or more subframes of a transmitted radio frame.

36 Claims, 17 Drawing Sheets

Related U.S. Application Data continuation of application No. 14/807,024, filed on Jul. 23, 2015, now Pat. No. 9,867,187.

(60) Provisional application No. 62/033,035, filed on Aug. 4, 2014.

(51) Int. Cl.
  *H04L 27/26* (2006.01)
  *H04W 74/08* (2009.01)
  *H04W 72/12* (2009.01)

(58) Field of Classification Search
  CPC ... H04W 28/04; H04W 72/04; H04W 72/042; H04W 88/08; H04W 72/0446; H04L 5/0007
  See application file for complete search history.

(56) References Cited

U.S. PATENT DOCUMENTS

| | | | | |
|---|---|---|---|---|
| 2009/0257520 A1* | 10/2009 | Lin | ............... | H04L 5/0023 375/260 |
| 2009/0262692 A1* | 10/2009 | Olszewski | ............ | H04L 5/0007 370/329 |
| 2010/0034186 A1* | 2/2010 | Zhou | .................. | H04L 27/2621 370/344 |
| 2010/0215007 A1 | 8/2010 | Zhang et al. | | |
| 2012/0039205 A1 | 2/2012 | Kogure et al. | | |
| 2012/0039293 A1 | 2/2012 | Feng et al. | | |
| 2012/0120925 A1 | 5/2012 | Kadous et al. | | |
| 2012/0182857 A1 | 7/2012 | Bertrand et al. | | |
| 2013/0064197 A1 | 3/2013 | Novak et al. | | |
| 2013/0070724 A1 | 3/2013 | Malladi et al. | | |
| 2013/0070725 A1 | 3/2013 | Wang et al. | | |
| 2013/0188505 A1* | 7/2013 | Nory | .................. | H04L 5/0053 370/252 |
| 2014/0003387 A1 | 1/2014 | Lee et al. | | |
| 2014/0036853 A1 | 2/2014 | Kim et al. | | |
| 2014/0092786 A1* | 4/2014 | He | .................. | H04L 1/1864 370/280 |
| 2014/0098689 A1 | 4/2014 | Lee et al. | | |
| 2014/0241232 A1* | 8/2014 | Damji | ............... | H04L 25/0204 370/312 |
| 2015/0131611 A1 | 5/2015 | Pi et al. | | |
| 2015/0245368 A1 | 8/2015 | Nukala et al. | | |
| 2015/0271824 A1 | 9/2015 | Zhang et al. | | |
| 2015/0350955 A1 | 12/2015 | Somasundaram et al. | | |
| 2015/0358124 A1 | 12/2015 | Suzuki et al. | | |
| 2016/0135172 A1 | 5/2016 | Sun et al. | | |
| 2016/0323911 A1 | 11/2016 | Au et al. | | |
| 2018/0110052 A1 | 4/2018 | Wei et al. | | |
| 2018/0205484 A1 | 7/2018 | Zhang et al. | | |
| 2018/0302798 A1 | 10/2018 | Eng et al. | | |
| 2018/0343648 A1* | 11/2018 | Han | .................. | H04W 52/243 |

FOREIGN PATENT DOCUMENTS

| | | |
|---|---|---|
| WO | WO2007021951 A2 | 2/2007 |
| WO | WO2010096524 A2 | 8/2010 |
| WO | WO2011056674 A2 | 5/2011 |
| WO | WO2013116520 A1 | 8/2013 |
| WO | WO2014113546 A1 | 7/2014 |
| WO | WO2014115781 A1 | 7/2014 |

OTHER PUBLICATIONS

European Search Report—EP19157478—Search Authority—The Hague—dated Mar. 18, 2019.
International Search Report and Written Opinion—PCT/US2015/041957—ISA/EPO—dated Nov. 3, 2015.
IPEA/EP, Second Written Opinion of the International Preliminary Examining Authority, Int'l. App. No. PCT/US2015/041957, dated Jul. 18, 2016, European Patent Office, Rijswijk, NL, 8 pgs.
Motorola: "Eutra SC-FDMA Uplink Resource Block, Resource Allocation and TP", 3GPP Draft; R1-060389_UL RB_RA+TP, 3rd Generation Partnership Project (3GPP), Mobile Competence Centre, 650, Route Des Lucioles ; F-06921 Sophia-Antipolis Cedex, France, vol. RAN WG1, No. Denver, USA; Feb. 9, 2006, Feb. 9, 2006 (Feb. 9, 2006), XP050101334, pp. 1-15, [retrieved on Feb. 9, 2006].
Panasonic: "PUCCH Resource Indication for Carrier Aggregation and SORTD," 3GPP TSG-RAN WG1 Meeting #60, R1-101252, Feb. 26, 2010, pp. 1-9.
Ratasuk R., et al., "License-Exempt LTE Deployment in Heterogeneous Network", IEEE, International Symposium on Wireless Communication Systems (ISWCS), Aug. 28, 2012 (Aug. 28, 2012), pp. 246-250, XP032263759, DOI: 10.1109/ISWCS.2012.6328367, ISBN: 978-1-4673-0761-1.

* cited by examiner

TECHNIQUES FOR CONFIGURING UPLINK TRANSMISSIONS USING SHARED RADIO FREQUENCY SPECTRUM BAND

CROSS REFERENCES

The present Application for Patent is a continuation of U.S. patent application Ser. No. 15/837,463 by Wei, et al., entitled "Techniques For Configuring Uplink Transmissions Using Shared Radio Frequency Spectrum Band" filed Dec. 11, 2017, which is a continuation of U.S. patent application Ser. No. 14/807,024 by Wei et al., entitled "Techniques for Configuring Uplink Channel Transmissions Using Shared Radio Frequency Spectrum Band," filed Jul. 23, 2015, which claims priority to U.S. Provisional Patent Application No. 62/033,035 by Wei et al., entitled "Techniques for Configuring Uplink Channel Transmissions Using Shared Radio Frequency Spectrum Band," filed Aug. 4, 2014, assigned to the assignee hereof, and is hereby expressly incorporated by reference herein in its entirety.

FIELD OF THE DISCLOSURE

The present disclosure, for example, relates to wireless communication systems, and more specifically to techniques for configuring uplink channel transmissions in a shared radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple pieces of user equipment (UEs). A base station may communicate with UEs on downlink channels (e.g., for transmissions from the base station to the UE) and uplink channels (e.g., for transmissions from the UEs to the base station).

Some modes of communication may enable communications with a UE over different radio frequency spectrum bands (e.g., a licensed radio frequency spectrum band and/or an unlicensed or shared radio frequency spectrum band) of a cellular network. With increasing data traffic in cellular networks that use a licensed radio frequency spectrum band, offloading of at least some data traffic to shared radio frequency spectrum band may provide a cellular operator with opportunities for enhanced data transmission capacity. Prior to gaining access to, and communicating over, the unlicensed (or shared) radio frequency spectrum band, a transmitting apparatus may, in some examples, perform a listen before talk (LBT) procedure to contend for access to the unlicensed radio frequency spectrum band. An LBT procedure may include performing a clear channel assessment (CCA) to determine whether a channel of the shared radio frequency spectrum band is available. When it is determined that the channel of the shared radio frequency spectrum band is not available (e.g., because another wireless device is already using the channel of the shared radio frequency spectrum band), a CCA may be performed for the channel again at a later time.

In some cases, transmissions may be performed according to techniques to enhance the likelihood of channel access by wireless devices that seek to use shared radio frequency spectrum band. Some exemplary techniques may include allocating resources for channel for use by a UE in a synchronized manner. In some examples, multiple base stations and UEs may have synchronized CCA procedures and established protocols for when a base station or UE may perform a CCA during a coordinated CCA subframe, for example.

SUMMARY

The present disclosure, for example, relates to wireless communications over a shared radio frequency spectrum band, including techniques for configuring uplink channel transmissions in a shared radio frequency spectrum band. For example, the present disclosure relates to configuring uplink transmissions using allocated uplink resources. Such allocated uplink resources may include an uplink channel comprising a number of allocated interlaces of resource blocks (RBs) for use by a user equipment (UE). An incoming data stream may be processed and then separated into multiple streams, each of which may further be processed and then mapped to the resource blocks (RBs) allocated for the UE. Such separation of the data stream into multiple streams may be through, for example, demultiplexing the data stream to obtain data for the allocated resource blocks (RBs) of the interlaces allocated to the UE. The demultiplexed data may be mapped onto the associated resource elements of the resource blocks (RBs) associated with the allocated interlaces, and transmitted. In some examples, different types of uplink channels, such as a physical uplink control channel (PUCCH), physical uplink shared channel (PUSCH) and/or a physical random access channel (PRACH) may be allocated to interlaces of resource blocks (RBs) in one or more subframes of a transmitted radio frame.

In some examples, a method for wireless communication is described. In one example, the method may include obtaining a data stream comprising data to be transmitted on one or more uplink channels, each of the one or more uplink channels comprising a number of allocated interlaces for an uplink transmission over a shared radio frequency spectrum band, where each of the number of allocated interlaces includes one or more resource blocks of the shared radio frequency spectrum band; demultiplexing the data stream to provide one or more demultiplexed data streams for the number of allocated interlaces; and mapping at least one of the one or more demultiplexed data streams onto a plurality of resource elements associated with the number of allocated interlaces.

In some examples, an apparatus for wireless communication is described. In one example, the apparatus may include means for obtaining a data stream comprising data to be transmitted on one or more uplink channels, each of the one or more uplink channels comprising a number of allocated interlaces for an uplink transmission over a shared radio frequency spectrum band, where each of the number of allocated interlaces includes one or more resource blocks of the shared radio frequency spectrum band; means for demultiplexing the data stream to provide one or more demultiplexed data streams for the number of allocated interlaces;

and means for mapping at least one of the one or more demultiplexed data streams onto a plurality of resource elements associated with the number of allocated interlaces.

In some examples, another apparatus for wireless communication is described. The apparatus may include, in an example, a processor and memory in electronic communication with the processor. The processor and memory may be configured to obtain a data stream comprising data to be transmitted on one or more uplink channels, each of the one or more uplink channels comprising a number of allocated interlaces for an uplink transmission over a shared radio frequency spectrum band, where each of the number of allocated interlaces includes one or more resource blocks of the shared radio frequency spectrum band; demultiplex the data stream to provide one or more demultiplexed data streams for the number of allocated interlaces; and map at least one of the one or more demultiplexed data streams onto a plurality of resource elements associated with the number of allocated interlaces.

In some examples, non-transitory computer-readable medium storing computer-executable code for wireless communication is described. In one example, the code may be executable by a processor to obtain a data stream comprising data to be transmitted on one or more uplink channels, each of the one or more uplink channels comprising a number of allocated interlaces for an uplink transmission over a shared radio frequency spectrum band, where each of the number of allocated interlaces includes one or more resource blocks of the shared radio frequency spectrum band; demultiplex the data stream to provide one or more demultiplexed data streams for the number of allocated interlaces; and map at least one of the one or more demultiplexed data streams onto a plurality of resource elements associated with the number of allocated interlaces.

In some examples of the method, apparatuses, or non-transitory computer-readable medium described above, each of the number of allocated interlaces may include a plurality of non-contiguous resource blocks or contiguous resource blocks of the shared radio frequency spectrum band. In some examples, each of the number of allocated interlaces may include a plurality of resource blocks of the shared radio frequency spectrum band, where a first subset of the plurality of resource blocks are contiguous and a second subset of the plurality of resource blocks are non-contiguous. In some examples, the one or more uplink channels may include a physical uplink shared channel (PUSCH). For example, the one or more resource blocks of the number of allocated interlaces for the PUSCH can include non-adjacent resource blocks, and a separate demultiplexed data stream can be mapped to each resource block of the non-adjacent resource blocks. In some examples, the one or more resource blocks of the number of allocated interlaces for the PUSCH can include at least two adjacent resource blocks, and one or more demultiplexed data stream can be mapped to each resource block of the at least two adjacent resource blocks. The plurality of resource elements, in some examples, may be transmitted using single carrier frequency division multiple access (SC-FDMA) techniques. In some examples, the method, apparatuses, or non-transitory computer-readable medium described above may further include processes, features, means, or code for performing a discrete Fourier transform (DFT) for each demultiplexed data stream.

In some examples of method, apparatuses, or non-transitory computer-readable medium described above, the plurality of resource elements may be transmitted using orthogonal frequency division multiple access (OFDMA) techniques. In some examples of the method, apparatuses, or non-transitory computer-readable medium described above, the mapping may include mapping at least one of the one or more demultiplexed data stream onto the plurality of resource elements associated with each cluster of adjacent allocated interlaces.

In some examples of the method, apparatuses, or non-transitory computer-readable medium described above, the one or more uplink channels may include a physical uplink control channel (PUCCH). Some of the method, apparatuses, or non-transitory computer-readable medium may further include processes, features, means, or code for performing a DFT for at least one of the one or more demultiplexed data streams. The method, apparatuses, or non-transitory computer-readable medium may further include, in some examples, processes, features, means, or code for determining a payload size of the data to be transmitted on the PUCCH, and for encoding the data to be transmitted using an encoding scheme selected based on the payload size. In these examples, the processes, features, means, or code for encoding the data may include processes, features, means, or code for selecting the encoding scheme to encode the data based at least in part on a threshold value of the payload size. In some examples, the method, apparatuses, or non-transitory computer-readable medium may further include processes, features, means, or code for rate matching the encoded data based at least in part on the number of allocated interlaces for the PUCCH. The method, apparatuses, or non-transitory computer-readable medium may further include, in some examples, processes, features, means, or code for the interleaving the rate-matched encoded data. In some examples, the method, apparatuses, or non-transitory computer-readable medium may further include processes, features, means, or code for scrambling the interleaved and rate-matched encoded data. In some examples, the method, apparatuses, or non-transitory computer-readable medium may further include processes, features, means, or code for spreading each of the one or more demultiplexed data streams using a spreading sequence. In some examples, the method, apparatuses, or non-transitory computer-readable medium may further include processes, features, means, or code for multiplexing each of the one or more demultiplexed data streams with a reference signal.

In some examples of the method, apparatuses, or non-transitory computer-readable medium described above, the one or more uplink channels may include a physical random access channel (PRACH). In these examples, the method, apparatuses, or non-transitory computer-readable medium described above may further include processes, features, means, or code for selecting a subset of the number of allocated interlaces for a random access request, and for encoding the data to be transmitted into the data stream for the selected subset of the number of allocated interlaces. The method, apparatuses, or non-transitory computer-readable medium may further include, in some examples, processes, features, means, or code for rate matching the encoded data based at least in part on the number of allocated interlaces to the PRACH. In some examples, the method, apparatuses, or non-transitory computer-readable medium may further include processes, features, means, or code for interleaving the rate-matched encoded data. In some examples, the method, apparatuses, or non-transitory computer-readable medium may further include processes, features, means, or code for scrambling the interleaved and rate-matched encoded data. Some examples of the method, apparatuses, or non-transitory computer-readable medium may include processes, features, means, or code for spreading each of the one or more demultiplexed data streams for each of the number of allocated interlaces, and for performing a DFT for each of the one or more demultiplexed data streams. In some examples, the method, apparatuses, or non-transitory computer-readable medium may include processes, features, means, or code for multiplexing each of the one or more demultiplexed data streams for each of the number of allocated interlaces with a reference signal.

In some examples of the method, apparatuses, or non-transitory computer-readable medium described above, the one or more uplink channels include a PUCCH, a PUSCH, and a PRACH, and in some examples each of the PUCCH, PUSCH, and PRACH includes one or more clusters of allocated interlaces. In some examples each of the one or more clusters of allocated interlaces may include the number of allocated interlaces for one of the PUCCH, PUSCH, or PRACH. In some examples of the method, apparatuses, or non-transitory computer-readable medium described above, the PUCCH may include one or more clusters of allocated interlaces in a first uplink subframe of a radio frame. In some examples of the method, apparatuses, or non-transitory computer-readable medium described above, the PRACH may include one or more clusters of allocated interlaces in a first uplink subframe of a radio frame. In some examples of the method, apparatuses, or non-transitory computer-readable medium described above, the PUSCH may include a first subset of clusters of allocated interlaces in a first uplink subframe of a radio frame and a second subset of clusters of allocated interlaces for subsequent uplink subframes of the radio frame, the second subset of clusters of allocated interlaces having a different number of clusters of allocated interlaces than the first subset of clusters of allocated interlaces. In some examples of the method, apparatuses, or non-transitory computer-readable medium described above, clusters available for the first subset of clusters of allocated interlaces and the second subset of clusters of allocated interlaces may be determined based on control signaling received from a base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
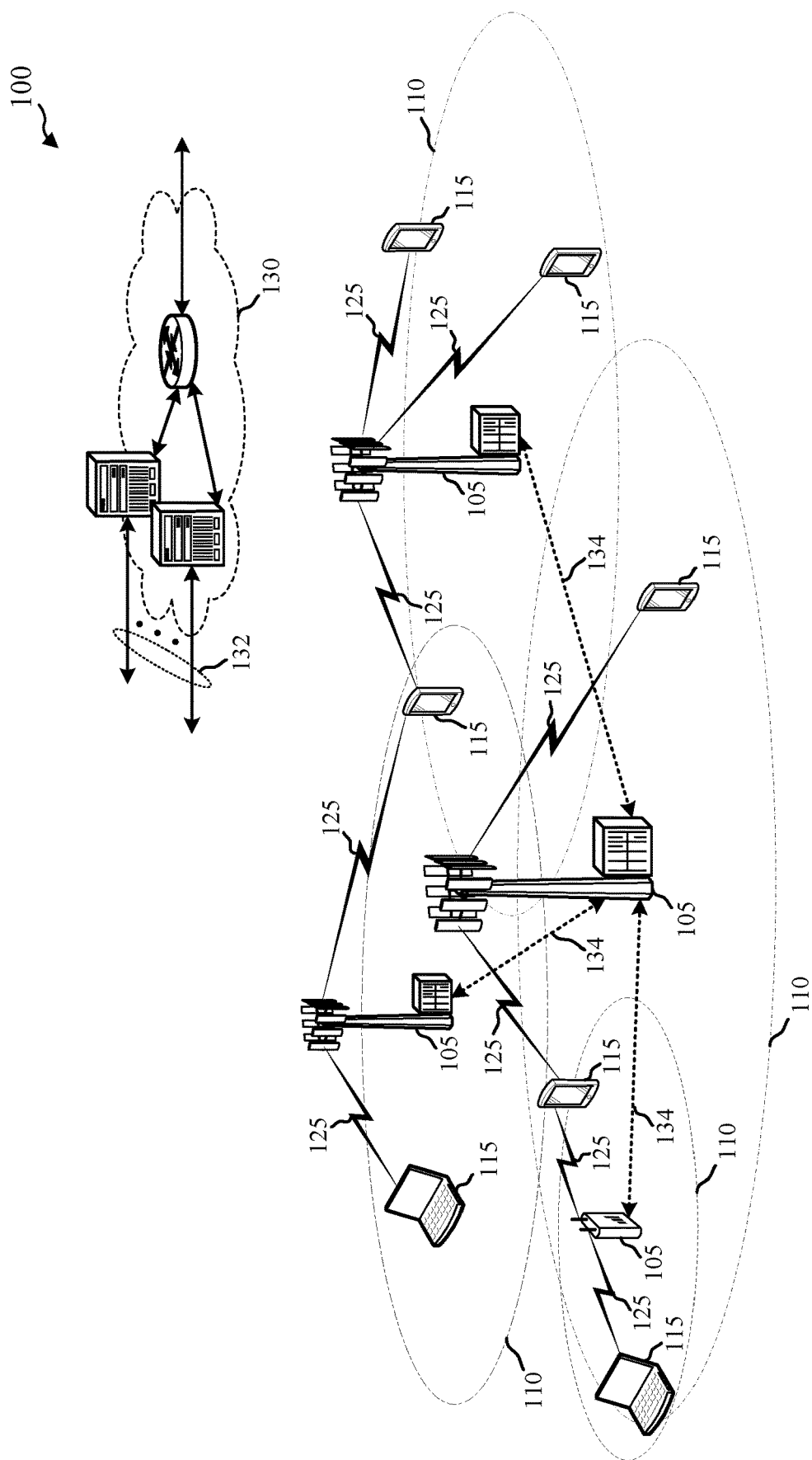
FIG. 1 shows a block diagram of a wireless communications system, in accordance with various aspects of the present disclosure.

Techniques are described in which a shared radio frequency spectrum band is used for at least a portion of communications over a wireless communication system. In some examples, the shared radio frequency spectrum band may be used for Long Term Evolution (LTE)/LTE-Advanced (LTE-A) communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to some users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

When making LTE and/or LTE-A uplink transmissions in unlicensed radio frequency spectrum band (e.g., a radio frequency spectrum band shared with apparatuses operating under LTE/LTE-A and/or other transmission protocols), it may be desirable to make an LTE/LTE-A uplink transmission in such a manner that it occupies a portion (for example, at least eighty percent (80%)) of the available bandwidth of the unlicensed radio frequency spectrum band. One way to achieve the desired bandwidth occupancy is to make an LTE/LTE-A uplink transmission across one or more interlaces of resource blocks (RBs). An interlace of resource blocks (RBs) may include one or more contiguous resource blocks or non-contiguous resource blocks. The one or more contiguous resource blocks or non-contiguous resource blocks may be selected in such a manner that the resource blocks span at least the desired percentage (e.g., 80%) of the available bandwidth of the shared radio frequency spectrum band. The terms shared radio frequency spectrum band and unlicensed radio frequency spectrum band may be used interchangeably herein and refer to radio frequency spectrum bands that may include one or more unlicensed radio frequency spectrum band(s), one or more authorized shared access (ASA) radio frequency spectrum band(s), and/or one or more radio frequency band(s) that may employ a Listen Before Talk (LBT) access scheme having a channel occupancy such as discussed above.

In some examples, uplink resources may be allocated for use in uplink transmissions of a UE. Such allocated uplink resources may include an uplink channel comprising a number of allocated interlaces of RBs, and an incoming data stream may be processed and data separated into each of the allocated interlaces of RBs for the user equipment (UE). The UE may, for example, demultiplex the data stream to obtain data for the allocated interlaces of RBs, and the demultiplexed data may be mapped onto resource elements associated with the allocated interlaces of RBs prior to transmission using the shared radio frequency spectrum band.

In some examples, following the mapping onto resource elements associated with the allocated interlaces of RBs, additional uplink processing may be performed, such as inverse fast Fourier transform (IFFT) and a half tone shift, for example, and the signal may be transmitted. In some examples, different types of uplink channels, such as a physical uplink control channel (PUCCH), physical uplink shared channel (PUSCH) and/or a physical random access channel (PRACH) may be allocated to interlaces of RBs in one or more subframes of a transmitted radio frame. In some examples, data transmitted using the PRACH may be may be spread on the allocated interlace(s) of RBs according to a spreading technique, such as a Zadoff-Chu spreading technique, and the data transmitted using resources determined by the spreading technique in order to reduce the likelihood of a collision with data transmitted by another transmitter.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples. Furthermore, while many of the examples are described with respect to an uplink transmission, techniques such as described herein may be used in downlink transmissions in a similar manner, as will be readily understood by one of skill in the art.

FIG. 1 shows a block diagram of a wireless communications system 100, in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through the core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro and/or small cell base stations). There may be overlapping geographic coverage areas 110 for different technologies. The base stations 105 may also utilize different radio technologies, such as cellular and/or wireless local area network (WLAN) radio access technologies. The base stations 105 may be associated with the same or different access networks or operator deployments.

In some examples, the wireless communications system 100 is an LTE/LTE-A network. In LTE/LTE-A networks, the term evolved Node B (eNB) may be used to describe the base stations 105, while the term UE may be used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations 105 and network equipment including macro eNBs, small cell eNBs, relay base stations, and the like. A UE 115 may also be able to communicate over different access networks, such as cellular or other wireless wide area network (WWAN), or WLAN.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The downlink transmissions may be made using a licensed radio frequency spectrum band, an unlicensed radio frequency spectrum band, or both. Similarly, the uplink transmissions may be made using a licensed radio frequency spectrum band, an unlicensed radio frequency spectrum band, or both. Each of the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency-division duplex (FDD) (e.g., using paired spectrum resources) or time-division duplex (TDD) operation (e.g., using unpaired spectrum resources). Frame structures for FDD (e.g., frame structure type 1) and TDD (e.g., frame structure type 2) may be defined.

In some examples of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples of the wireless communications system 100, various deployment scenarios for LTE/LTE-A in unlicensed radio frequency spectrum band may be supported, including a supplemental downlink mode in which LTE/LTE-A downlink capacity in a licensed radio frequency spectrum band may be offloaded to a shared radio frequency spectrum band, a carrier aggregation mode in which both LTE/LTE-A downlink and uplink capacity may be offloaded from a licensed radio frequency spectrum band to a shared radio frequency spectrum band, and a standalone mode in which LTE/LTE-A downlink and uplink communications between a base station 105 and a UE 115 may take place in a shared radio frequency spectrum band. Base stations 105 as well as UEs 115 may support one or more of these or similar modes of operation. OFDMA communications signals may be used in the communication links 125 for LTE/LTE-A downlink transmissions in an unlicensed and/or a licensed radio frequency spectrum band, while single carrier frequency division multiple access (SC-FDMA) or OFDMA communications signals may be used in the communication links 125 for LTE/LTE-A uplink transmissions in an unlicensed and/or a licensed radio frequency spectrum band.

Figure 2:
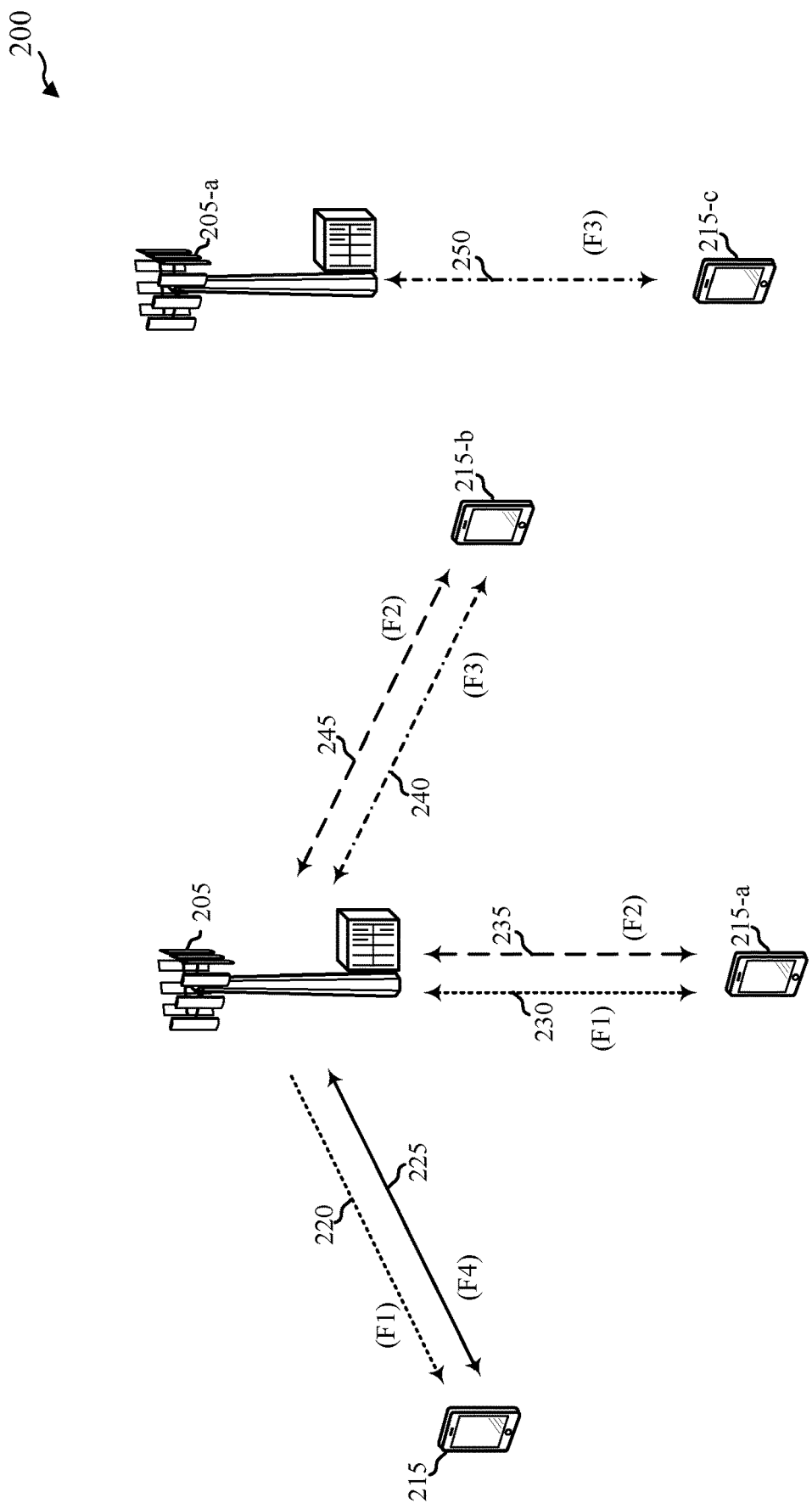
FIG. 2 shows a diagram that illustrates examples of deployment scenarios for using LTE in an unlicensed radio frequency spectrum band, in accordance with various aspects of the present disclosure.

FIG. 2 shows a diagram that illustrates examples of deployment scenarios for using LTE in an unlicensed radio frequency spectrum band, in accordance with various aspects of the present disclosure. In one example, FIG. 2 illustrates a wireless communications system 200 illustrating examples of a supplemental downlink mode a carrier aggregation mode, and a stand-alone mode for an LTE/LTE-A network that supports deployment using a shared radio frequency spectrum band. The wireless communications system 200 may be an example of portions of the wireless communications system 100 of FIG. 1. Moreover, the base stations 205 and 205-a may be examples of the base stations 105 of FIG. 1, while the UEs 215, 215-a, 215-b and 215-c may be examples of the UEs 115 of FIG. 1.

In the example of a supplemental downlink mode in the wireless communications system 200, the base station 205 may transmit OFDMA communications signals to a UE 215 using a downlink 220. The downlink 220 may be associated with a frequency F1 in a shared radio frequency spectrum band. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed radio frequency spectrum band. The downlink 220 in the unlicensed radio frequency spectrum band and the bidirectional link 225 in the licensed radio frequency spectrum band may operate concurrently. The downlink 220 may provide a downlink capacity offload for the base station 205. In some examples, the downlink 220 may be used for unicast services (e.g., addressed to one UE) services or for multicast services (e.g., addressed to several UEs). This scenario may occur with any service provider (e.g., traditional mobile network operator (MNO)) that uses a licensed radio frequency spectrum band and desires to relieve some of the traffic and/or signaling congestion.

In one example of a carrier aggregation mode in the wireless communications system 200, the base station 205 may transmit OFDMA communications signals to a UE 215-a using a bidirectional link 230 and may receive SC-FDMA or OFDMA communications signals from the same UE 215-a using the bidirectional link 230. The bidirectional link 230 may be associated with the frequency F1 in the unlicensed radio frequency spectrum band. The base station 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency F2 in a licensed radio frequency spectrum band. The bidirectional link 230 may provide a downlink and uplink capacity offload for the base station 205. Like the supplemental downlink described above, this scenario may occur with any service provider (e.g., MNO) that uses a licensed radio frequency spectrum band and desires to relieve some of the traffic and/or signaling congestion.

In another example of a carrier aggregation mode in the wireless communications system 200, the base station 205 may transmit OFDMA communications signals to a UE 215-b using a bidirectional link 240 and may receive SC-FDMA or OFDMA communications signals from the same UE 215-b using the bidirectional link 240. The bidirectional link 240 may be associated with a frequency F3 in a shared radio frequency spectrum band. The base station 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency F2 in the licensed radio frequency spectrum band. The bidirectional link 240 may provide a downlink and uplink capacity offload for the base station 205. This example and those provided above are presented for illustrative purposes and there may be other similar modes of operation or deployment scenarios that combine LTE/LTE-A in licensed radio frequency spectrum band and unlicensed radio frequency spectrum band for capacity offload.

As described above, a service provider that may benefit from the capacity offload offered by using LTE/LTE-A in unlicensed radio frequency spectrum band may be a traditional MNO with LTE/LTE-A radio frequency spectrum band. For these service providers, an example may include a bootstrapped mode (e.g., supplemental downlink, carrier aggregation) that uses the LTE/LTE-A primary component carrier (PCC) on the licensed radio frequency spectrum band and a secondary component carrier (SCC) on the unlicensed radio frequency spectrum band.

In the carrier aggregation mode, data and control may be communicated in the licensed radio frequency spectrum band (e.g., bidirectional links 225, 235, and 245) while data may be communicated in the unlicensed radio frequency spectrum band (e.g., bidirectional links 230 and 240). The carrier aggregation mechanisms supported when using unlicensed radio frequency spectrum band may fall under a hybrid FDD-TDD carrier aggregation or a TDD-TDD carrier aggregation with different symmetry across component carriers.

FIG. 2 also shows an example of a base station 205-a that may communicate with UE 215-c in a stand-alone mode. In this example, the base station 205-a may transmit OFDMA communications signals to the UE 215-c using a bidirectional link 250 and may receive SC-FDMA or OFDMA communications signals from the UE 215-c using the bidirectional link 250. The bidirectional link 250 may be associated with the frequency F3 in a shared radio frequency spectrum band described above. The standalone mode may be used in non-traditional wireless access scenarios, such as in-stadium access (e.g., unicast, multicast), for example. One type of service provider for this mode of operation may be a stadium owner, cable company, event host, hotel, enterprise, or large corporation that does not have licensed radio frequency spectrum band.

In some examples, a transmitting device such as the base stations 105 described with reference to FIG.1 and/or the base stations 205 described with reference to FIG. 2, or the UEs 115 described with reference to FIG. 1 and/or the UEs 215 described with reference to FIG. 2, may use a gating interval to gain access to a channel of the shared radio frequency spectrum band (e.g., to a physical channel of the licensed radio frequency band or unlicensed radio frequency spectrum band). The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device is to perform a Clear Channel Assessment (CCA). The outcome of the CCA may indicate to the transmitting device whether a channel of the shared unlicensed radio frequency spectrum band is available or in use. When the CCA indicates that the channel is available (e.g., "clear" for use), the gating interval may allow the transmitting device to use the channel—such as for a predefined transmission interval. When the CCA indicates that the channel is not available (e.g., in use or reserved), the gating interval may prevent the transmitting device from using the channel during the transmission interval.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in a shared radio frequency spectrum band, and to synchronize at least one boundary of the periodic gating interval with at least one boundary of a periodic frame structure (e.g., LTE/LTE-A radio frame) associated with the cellular downlink. As discussed above, in some aspects of the disclosure transmissions may use one or more interlaces that are allocated for use by a UE (e.g., the UEs 115 of FIG. 1 and/or the UEs 215 of FIG. 2).

Figure 3:
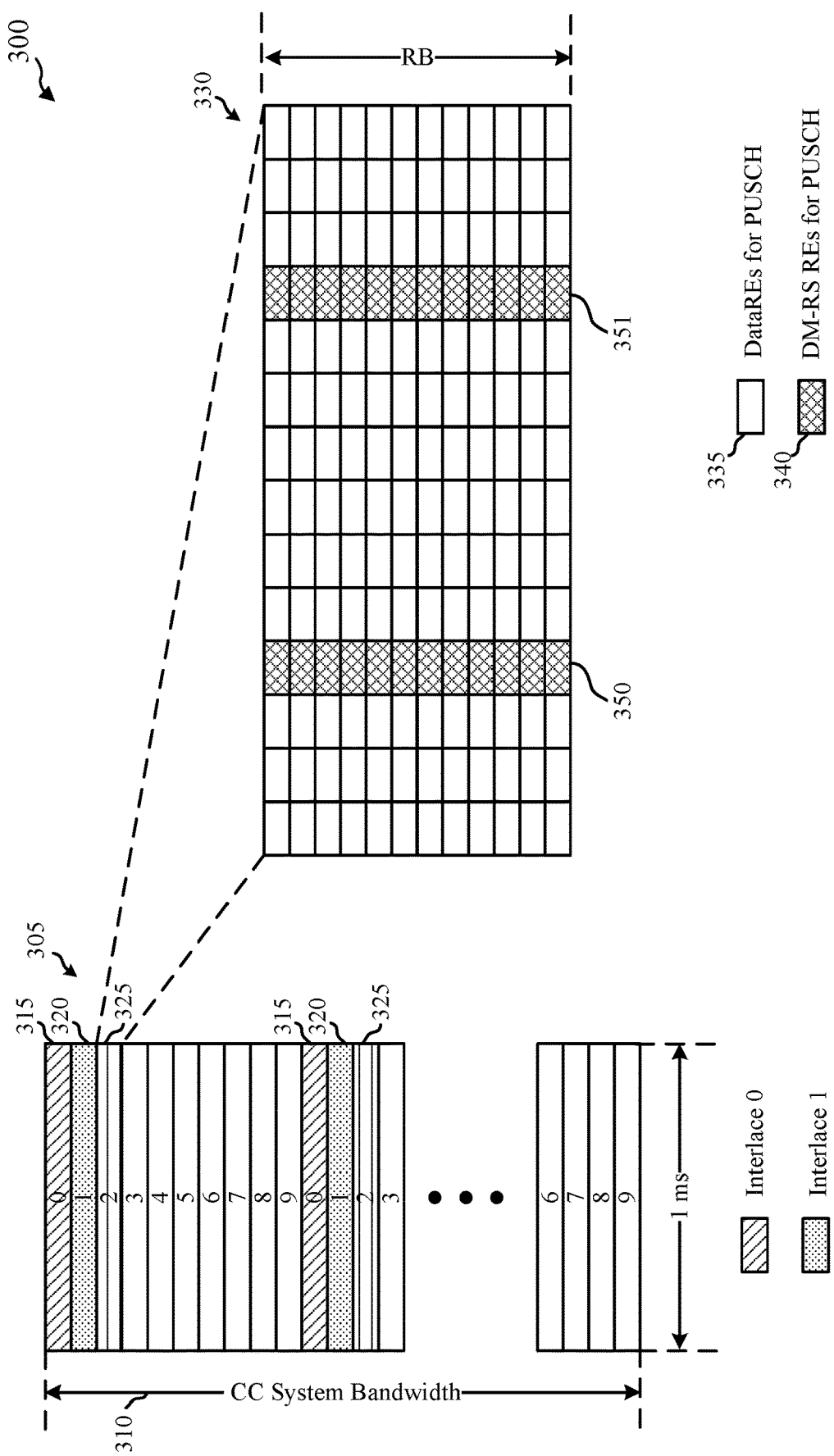
FIG. 3 shows an example of a subframe and associated wireless resources of a resource block (RB) of a physical uplink shared channel (PUSCH), in accordance with various aspects of the present disclosure.

FIG. 3 shows an example 300 of a subframe 305 and associated wireless resources of a resource block (RB) 330 of a physical uplink shared channel (PUSCH), in accordance with various aspects of the present disclosure. The subframe 305 may be transmitted, for example, in an uplink transmission from a UE, such as the UEs 115 of FIG. 1 and/or the UEs 215 of FIG. 2. In this example, a one millisecond subframe 305 includes a number of RBs. As mentioned above, when making LTE/LTE-A uplink transmissions in an unlicensed radio frequency spectrum band, it may be desirable for the transmission to occupy at least eighty percent (80%) of a component carrier (CC) system bandwidth 310.

One way to achieve the 80% bandwidth occupancy is to make an LTE/LTE-A uplink transmission across multiple RBs that span the CC system bandwidth 310. These multiples of RBs make up an interlace, such as a first interlace of RBs 315, a second interlace of RBs 320, and a third interlace of RBs 325. An interlace may include multiple RBs 330 that spread throughout the CC system bandwidth 310. For example, for 20 MHz bandwidth, in some deployments, there are 100 RBs (e.g., RB #0 through RB 99). In some examples, the first interlace of RBs 315 may include RB #0, 10, 20, . . . 90, the second interlace of RBs 320 may include RB #1, 11, 21, . . . 91, and so on. The interlaces of RBs 315, 320 and 325, as illustrated in FIG. 3, for an uplink transmission may be allocated in such a manner that RBs 330 transmitted in the transmission span at least 80% of the available CC system bandwidth 310. In some examples, one or more of the allocated interlaces may include a number of RBs 330 in which a first subset of the RBs 330 are contiguous and a second subset of the RBs 330 are non-contiguous.

According to some examples, each resource block of the first interlace of RBs 315, the second interlace of RBs 320, or the third interlace of RBs 325, such as RBs 330, may include data for an uplink channel (e.g., PUSCH, PUCCH, PRACH, etc.). In the example of FIG. 3, the third interlace of RBs 325 may include multiple RBs 330 for a PUSCH. As illustrated in FIG. 3, a fourth symbol 350 and an eleventh symbol 351 of a RB 330 may include demodulation reference signal (DM-RS) resource elements (REs) 340 for the PUSCH, and the remaining symbols may include data REs 335.

Figure 4:
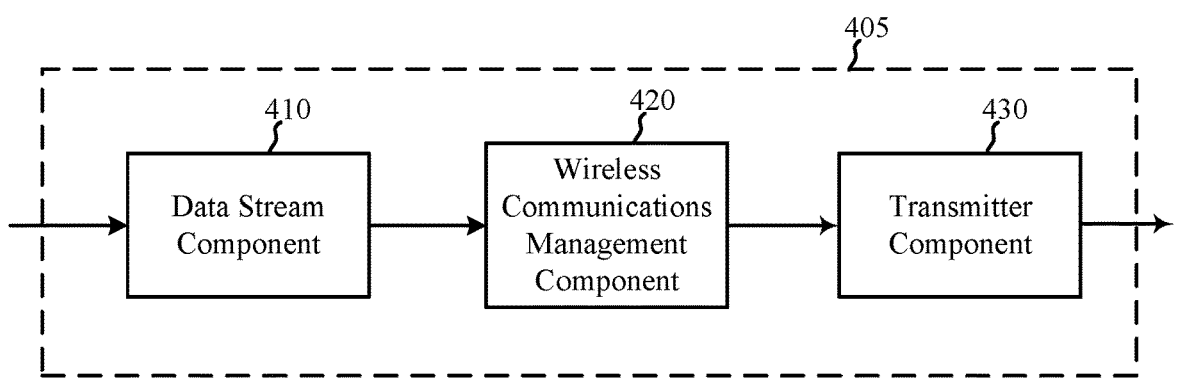
FIG. 4 shows a block diagram of an apparatus for use in wireless communication, in accordance with various aspects of the present disclosure.

FIG. 4 shows a block diagram 400 of an apparatus 405 for use in wireless communication, in accordance with various aspects of the present disclosure. In some examples, the apparatus 405 may be an example of one or more aspects of one of the UEs 115 described with reference to FIG. 1 and/or the UEs 215 described with reference to FIG. 2. The apparatus 405 may also be a processor. The apparatus 405 may include a data stream component 410, a wireless communications management component 420, and/or a transmitter component 430. Each of these components may be in communication with each other.

The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The memory may be an on-board memory, a separate memory, or a combination thereof In some examples, the data stream component 410 may be or include one or more processing components that provide data to be transmitted (e.g., from a MAC layer). In some examples, the transmitter component 430 may be or include an radio frequency (RF) transmitter, such as an RF transmitter operable to transmit in a first RF spectrum band and/or a second RF spectrum band. The transmitter component 430 may be used to transmit various types of data and/or control signals (i.e., transmissions) over one or more communication links of the wireless communications system including, for example, licensed and/or unlicensed radio frequency spectrum bands. The transmitter component 430 may be used to transmit, for example, subframe 305 of FIG. 3.

In some examples, the wireless communications management component 420 may manage the receipt of data from the data stream component 410 and/or the transmission of wireless communications via the transmitter component 430. When data is received from the data stream component, the wireless communications management component 420 may perform, for example, transport block processing to prepare the data for transmission.

On the transmission side, and by way of example, the wireless communications management component 420 may manage transmissions for the purpose of managing demultiplexing of the data stream following transport block processing, and mapping of some or all data of the data stream to transmission resources (e.g., tone mapping of data to transmission resources for transmission according to SC-FDMA or OFDMA techniques) from the transmitter component 430. In some cases, the wireless communications management component 420 may perform a discrete Fourier transform (DFT) of the demultiplexed data stream and map the resultant signal to resources associated with one or more allocated interlaces. In other cases, the wireless communications management component 420 may manage the precoding of interlaces and/or select parameters used to transmit one or more reference symbols associated with a stream of bits or modulation symbols.

Figure 5:
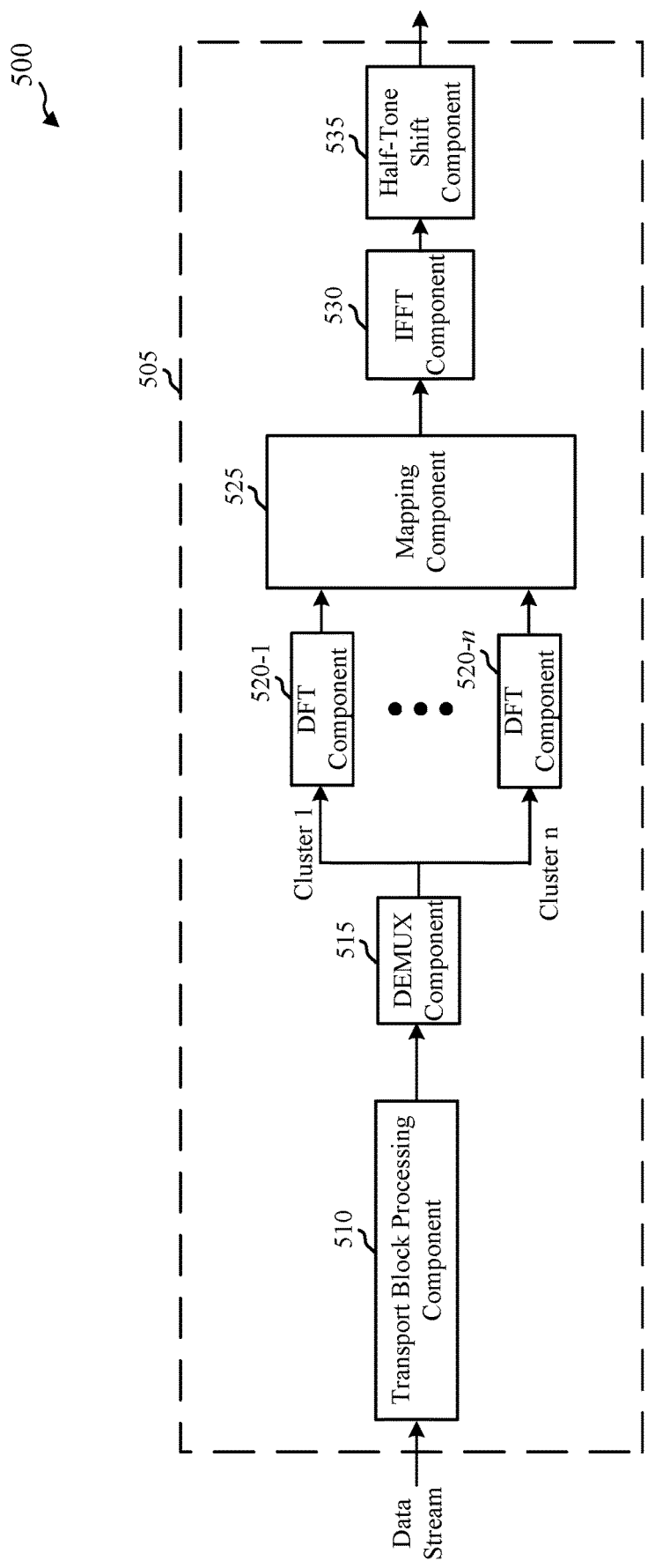
FIG. 5 shows a block diagram of an apparatus for use in wireless communication, in accordance with various aspects of the present disclosure.

FIG. 5 shows a block diagram 500 of an apparatus 505 for use in wireless communication, in accordance with various aspects of the present disclosure. In some examples, the apparatus 505 may be an example of one or more aspects of one of the UEs 115 described with reference to FIG. 1 and/or the UEs 215 described with reference to FIG. 2. In some examples, the apparatus 505 may be an example of wireless communications management component 420 of FIG. 4. The apparatus 505 may also be a processor. The apparatus 505 may include a transport block processing component 510, a demultiplexing (DEMUX) component 515, a number of DFT component s 520-1 through 520-n, where n is greater than 1, a mapping component 525, an IFFT component 530, and a half-tone shift component 535. Each of these components may be in communication with each other.

The components of the apparatus 505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. The memory may be an on-board memory, a separate memory, or a combination thereof Transport block processing component 510 may perform transport block processing functions for an LTE/LTE-A system, such as encoding of the data stream, rate matching, scrambling, and modulation mapping (e.g., quadrature phase shift keying (QPSK)), for example. The demultiplexing component 515 may demultiplex the data stream from the transport block processing component 510 according to the RBs that are allocated for the uplink transmission. For example, an uplink transmission may have one interlace, which is comprised of a number of non-contiguous RBs, and the demultiplexing component 515 may provide one or more demultiplexed data streams for the number of allocated RBs of the interlace. In some examples, an uplink transmission may have two or more interlaces, and some of the interlaces may include RBs that are contiguous, for example, contiguous interlaces (e.g., the first interlace of RBs 315 and the second interlace of RBs 320 and/or the third interlace of RBs 325, as illustrated in FIG. 3). In such a manner, clusters of interlaces may be output from the demultiplexing component 515, as indicted as cluster 1 through cluster n in FIG. 5.

The demultiplexed data streams in this example are provided to the DFT component s 520-1 through 520-n, which may perform a discrete Fourier transform on the associated data stream. For example, N may be an integer greater than 1. The number (N) of DFT components 5201-n may be based at least in part on the allocated interlaces for the uplink transmission. Such a discrete Fourier transform may be used to transform each data stream in preparation for transmission using SC-FDMA, and the transformed data streams may be provided to the mapping component 525 which may map the data streams onto REs associated with each of the number of allocated interlaces of RBs. Following the mapping of the data streams onto REs for each of the allocated interlaces, the IFFT component 530 may perform an inverse fast Fourier transform on the data stream and provide the transformed data stream to the half-tone shift component 535 that may shift the frequency shift of the data stream by a half-tone and provide the output to a transmitter component (e.g., transmitter component 430 of FIG. 4).

Figure 6:
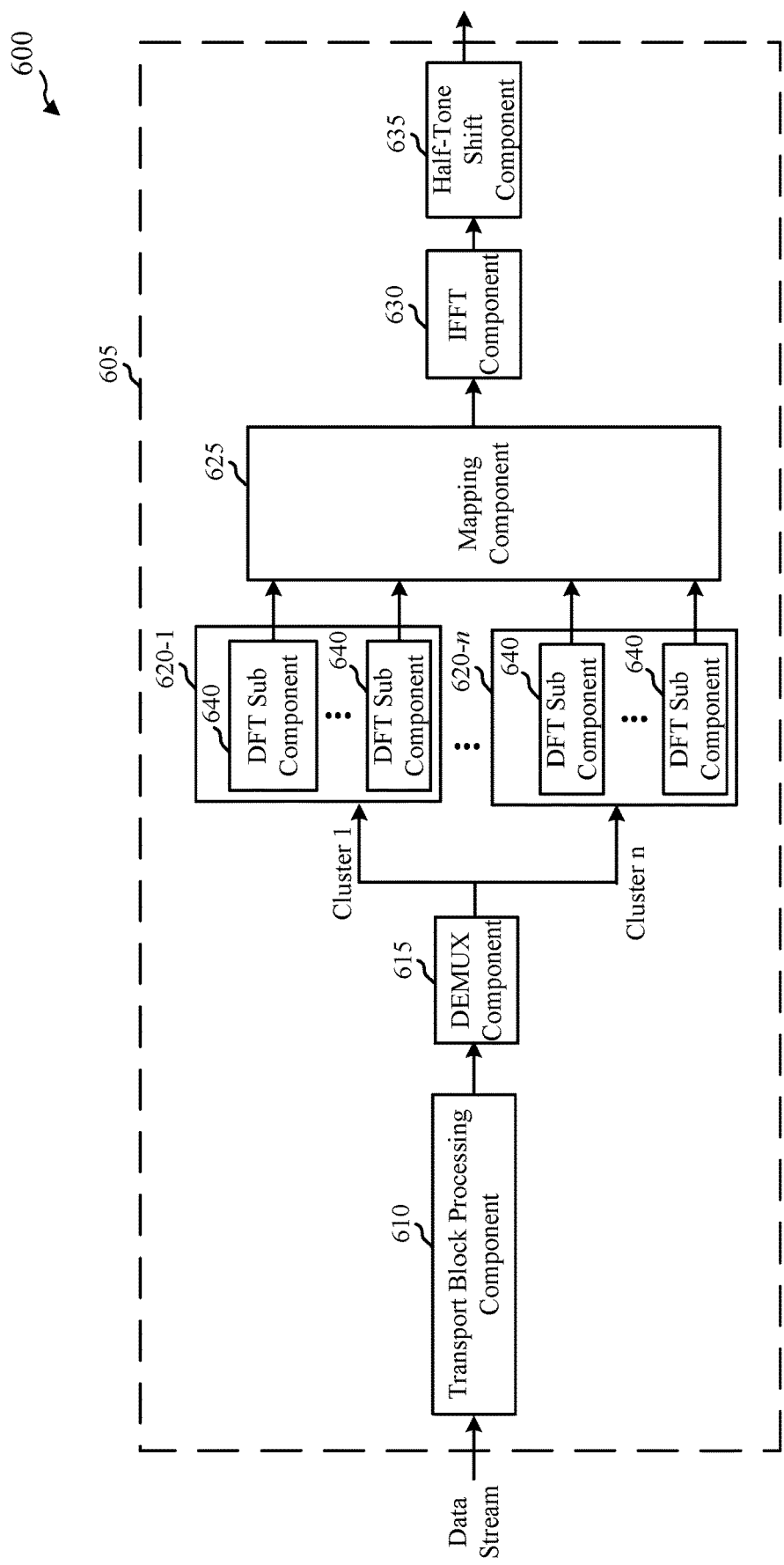
FIG. 6 shows a block diagram of an apparatus for use in wireless communication, in accordance with various aspects of the present disclosure.

As discussed above, in some examples the allocated interlaces may include a number of adjacent allocated interlaces that may include a contiguous RBs. In other examples, the allocated interlaces may include a number of non-contiguous RBs. FIG. 6 shows a block diagram 600 of an apparatus 605 for use in wireless communication, in accordance with various aspects of the present disclosure. In some examples, the apparatus 605 may be an example of one or more aspects of one of the UEs 115 described with reference to FIG. 1 and/or the UEs 215 described with reference to FIG. 2. In some examples, the apparatus 605 may be an example of wireless communications management component 420 of FIG. 4, and/or may be an example of the apparatus 505 of FIG. 5. The apparatus 605 may also be a processor. The apparatus 605 may include a transport block processing component 610, a demultiplexing (DEMUX) component 615, a number of DFT components 620-1 through 620-n, a mapping component 625, an IFFT component 630, and a half-tone shift component 635. Each of these components may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. The memory may be an on-board memory, a separate memory, or a combination thereof Transport block processing component 610, similarly as discussed above with respect to the transport block processing component 510 illustrated in FIG. 5, may perform transport block processing functions for an LTE/LTE-A system. The demultiplexing component 615 may demultiplex the data stream from the transport block processing component 610 according to the interlaces of RBs that are allocated for the uplink transmission. In cases where the allocated interlaces of resource blocks may include non-contiguous RBs, each of the DFT component s 620-1 through 620-n may include DFT sub-components 640 that may perform a DFT on each of the non-adjacent RBs within each cluster of RBs. Thus, each of the RBs in a cluster may include a separate demultiplexed data stream for each non-adjacent allocated RB. In cases where the allocated interlaces of RBs may include contiguous RBs, each of the DFT components 620-1 through 620-n may include DFT sub-components 640 that may perform a DFT for the adjacent RBs within each cluster. Such a DFT may be used to transform each data stream in preparation for transmission using SC-FDMA, and the transformed data streams may be provided to the mapping component 625 which may map the data streams onto REs associated with each of the number of allocated interlaces RBs. Following the mapping of the data streams onto REs for each of the allocated interlaces, the IFFT component 630 may perform an IFFT on the data stream and provide the transformed data stream to the half-tone shift component 635 that may shift the frequency shift the data stream by a half-tone and provide the output to a transmitter component (e.g., transmitter component 430 of FIG. 4).

Figure 7:
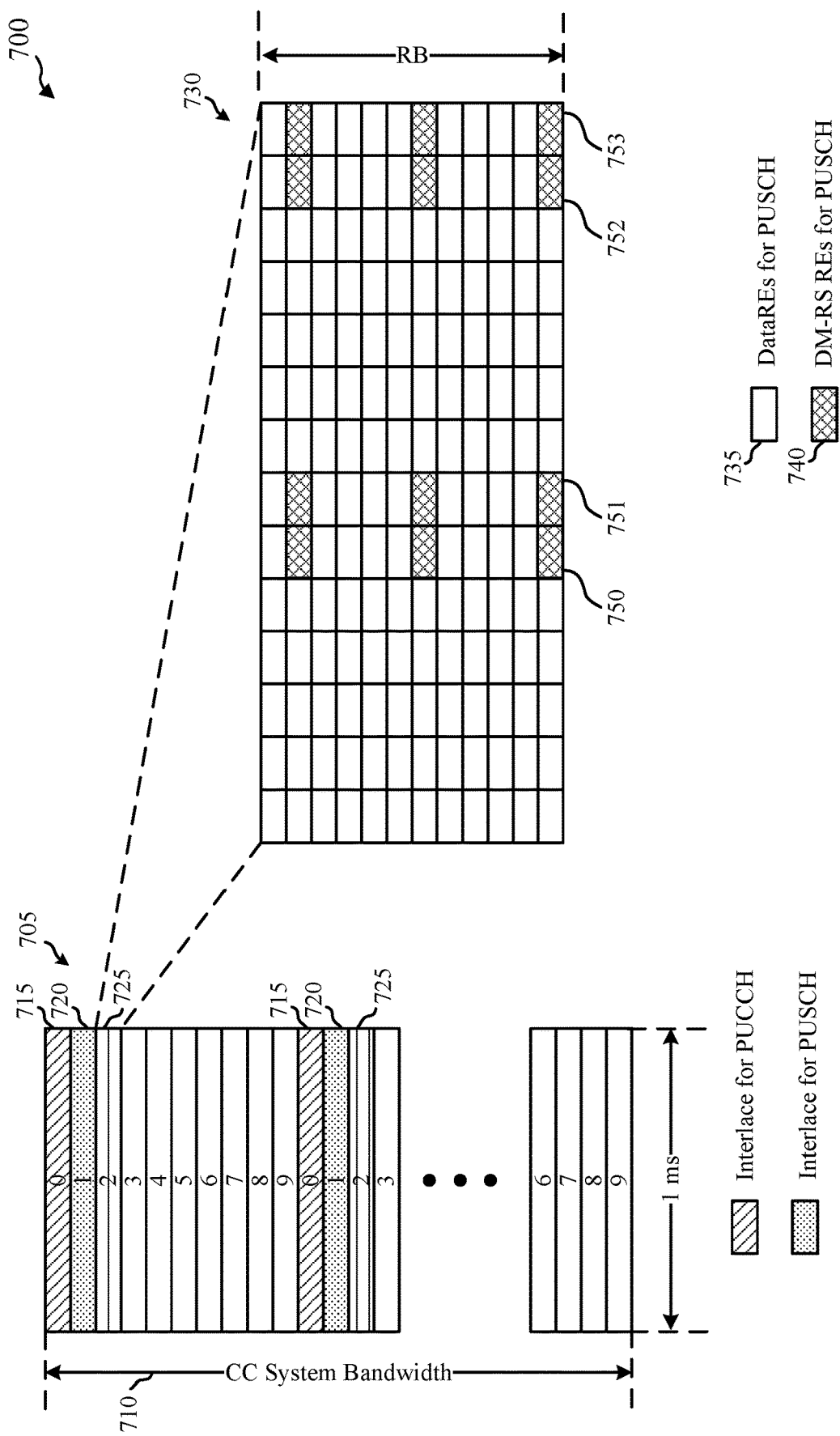
FIG. 7 shows an example of a subframe and associated wireless resources of a resource block of a physical uplink shared channel (PUSCH), in accordance with various aspects of the present disclosure.

FIG. 7 shows an example 700 of a subframe 705 and associated wireless resources of a resource block (RB) 730 of a physical uplink shared channel (PUSCH), in accordance with various aspects of the present disclosure. Subframe 705 may be transmitted, for example, in an uplink transmission from a UE, such as the UEs 115 of FIG. 1 and/or the UEs 215 of FIG. 2. In this example, a one millisecond subframe 705 includes a number of RBs 730 that may provide uplink transmission resources that span the component carrier (CC)

system bandwidth 710. These multiple resource blocks may include interlaces, such as a first interlace of RBs 715, a second interlace of RBs 720, and a third interlace of RBs 725. In some examples, the first interlace of RBs 715 may be used for PUCCH transmissions, and the second interlace of RBs 720 and the third interlace of RBs 725 may be used for PUSCH transmissions. Similarly as discussed above, the RBs 730, such as the first interlace of RBs 715, the second interlace of RBs 720, and the third interlace of RBs 725, for an uplink transmission may be allocated in such a manner that RBs 730 transmitted in the transmission span at least 80% of the available CC system bandwidth 710.

According to some examples, each resource block of the first interlace of RBs 715, the second interlace of RBs 720, or the third interlace of RBs 725, such as RB 730 may include data for an uplink channel (e.g., PUSCH, PUCCH, PRACH, etc.). In the example of FIG. 7, the third interlace of RBs 725 may include multiple RBs 730 for a PUSCH. In some examples, rather than using SC-FDMA for uplink transmissions, a UE (e.g., the UEs 115 of FIG. 1 and/or the UEs 215 of FIG. 2), OFDMA may be used for uplink transmissions. If a UE is capable of transmitting OFDMA uplink transmissions, OFDM may be used for higher modulation and coding schemes (MCS) and MIMO transmissions. In such examples, transmissions between the UE and base station will have symmetric downlink and uplink waveforms. As illustrated in FIG. 7, a sixth symbol 750, a seventh symbol 751, a thirteenth symbol 752 and a fourteenth symbol 753 of the RB 730 may include DM-RS REs 740 for the PUSCH, and the remaining symbols may include data REs 735.

Figure 8:
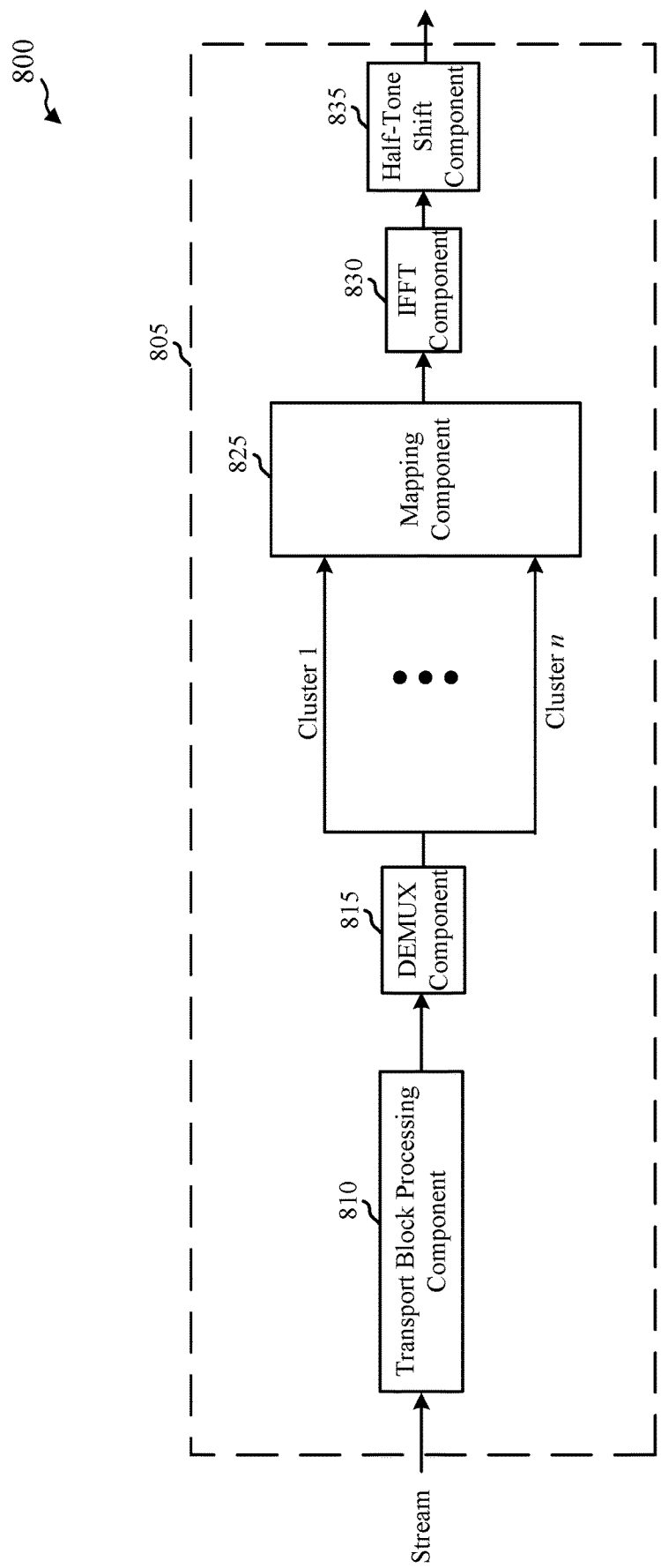
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of one or more aspects of one of the UEs 115 described with reference to FIG. 1 and/or the UEs 215 described with reference to FIG. 2. In some examples, the apparatus 805 may be an example of wireless communications management component 420 of FIG. 4. The apparatus 805 may also be a processor. The apparatus 805 may include a transport block processing component 810, a demultiplexing (DEMUX) component 815, a mapping component 825, an IFFT component 830, and a half-tone shift component 835. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. The memory may be an on-board memory, a separate memory, or a combination thereof Transport block processing component 810, similarly as discussed above with respect to the transport block processing component 510 illustrated in FIG. 5, may perform transport block processing functions for an LTE/LTE-A system. The demultiplexing component 815 may demultiplex the data stream from the transport block processing component 810 according to the RBs that are allocated for the uplink transmission. For example, an uplink transmission may have one interlace of RBs, which is comprised of a number of non-contiguous RBs, and the demultiplexing component 815 may provide one or more demultiplexed data streams for the number of allocated RBs. In some examples, an uplink transmission may have two or more interlaces of RBs, and some of the interlaces of RBs may comprise of resource blocks that are contiguous, for example, contiguous interlaces of RBs (e.g., first interlace of RBs 315, and second interlace of RBs 320 and/or third interlace of RBs 325, as illustrated in FIG. 3). In such a manner, clusters of interlaces may be output from the demultiplexing component 815, as indicted as cluster 1 through cluster n in FIG. 8.

The demultiplexed data streams in this example may include data streams to be used in OFDMA uplink transmissions, and may be provided to the mapping component 825 which may map the data streams onto REs associated with each of the number of allocated interlaces for the uplink transmission. Due to the OFDMA transmission scheme, each cluster may not be required to have a separate DFT function, as the mapping may occur directly on the demultiplexed signals. Following the mapping of the data streams onto REs for each of the allocated interlaces, the IFFT component 830 may perform an inverse fast Fourier transform on the data stream and provide the transformed data stream to the half-tone shift component 835 that may shift the frequency shift the data stream by a half-tone and provide the output to a transmitter component (e.g., transmitter component 430 of FIG. 4).

Figure 9:
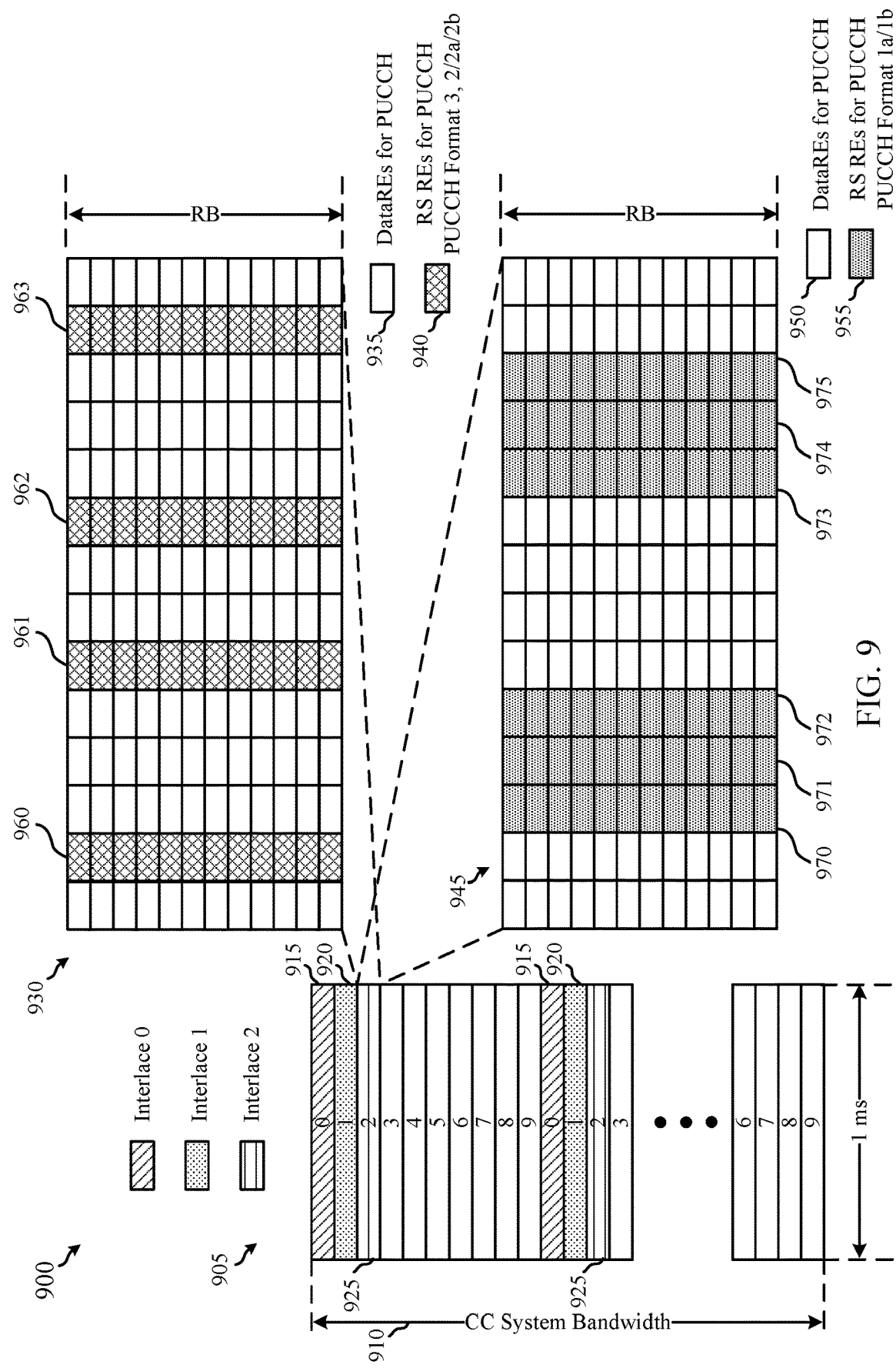
FIG. 9 shows an example of a subframe and associated wireless resources of resource blocks of a physical uplink control channel (PUCCH), in accordance with various aspects of the present disclosure.

FIG. 9 shows an example 900 of a subframe 905 and associated wireless resources of a first resource block 930 and a second resource block 945 of a physical uplink control channel (PUCCH), in accordance with various aspects of the present disclosure. Subframe 905 may be transmitted, for example, in an uplink transmission from a UE, such as the UEs 115 of FIG. 1 and/or the UEs 215 of FIG. 2. In this example, a one millisecond subframe 905 includes a number of RBs that may provide uplink transmission resources that span the component carrier (CC) system bandwidth 910. These multiple resource blocks may include interlaces, such as a first interlace of RBs 915, a second interlace of RBs 920, and a third interlace of RBs 925. Similarly as discussed above, the RBs, such as interlaces of RBs 915, 920 and 925, for an uplink transmission may be allocated in such a manner that resource blocks, such as the first resource block 930 and the second resource block 945, are transmitted in the transmission span at least 80% of the available CC system bandwidth 910.

According to some examples, each resource block of the first interlace of RBs 915, the second interlace of RBs 920, or the third interlace of RBs 925, such as the first resource block 930 may include data for an uplink channel (e.g., PUCCH). In the example of FIG. 9, the third interlace of RBs 925 may include a first resource block 930 of a PUCCH having a format similar to PUCCH format 3, or a format similar to PUCCH format 2/2a/2b as defined by the LTE/LTE-A protocols. As illustrated in FIG. 9, a second symbol 960, a sixth symbol 961, a ninth symbol 962, and a thirteenth symbol 963 of the first resource block 930 may include reference signal (RS) REs 940 for the PUCCH, and the remaining symbols may include data REs 935.

In other examples, within each RB of an interlace of RBs 915, 920 or 925 may include data having PUCCH format 1a or 1b as defined by the LTE/LTE-A protocols. As illustrated in FIG. 9, a third symbol 970, a fourth symbol 971, a fifth symbol 972, a tenth symbol 973, an eleventh symbol 974, and a twelfth symbol 975 of the second resource block 945 may include RS REs 950 for the PUCCH, and the remaining symbols may include data REs 955.

Figure 10:
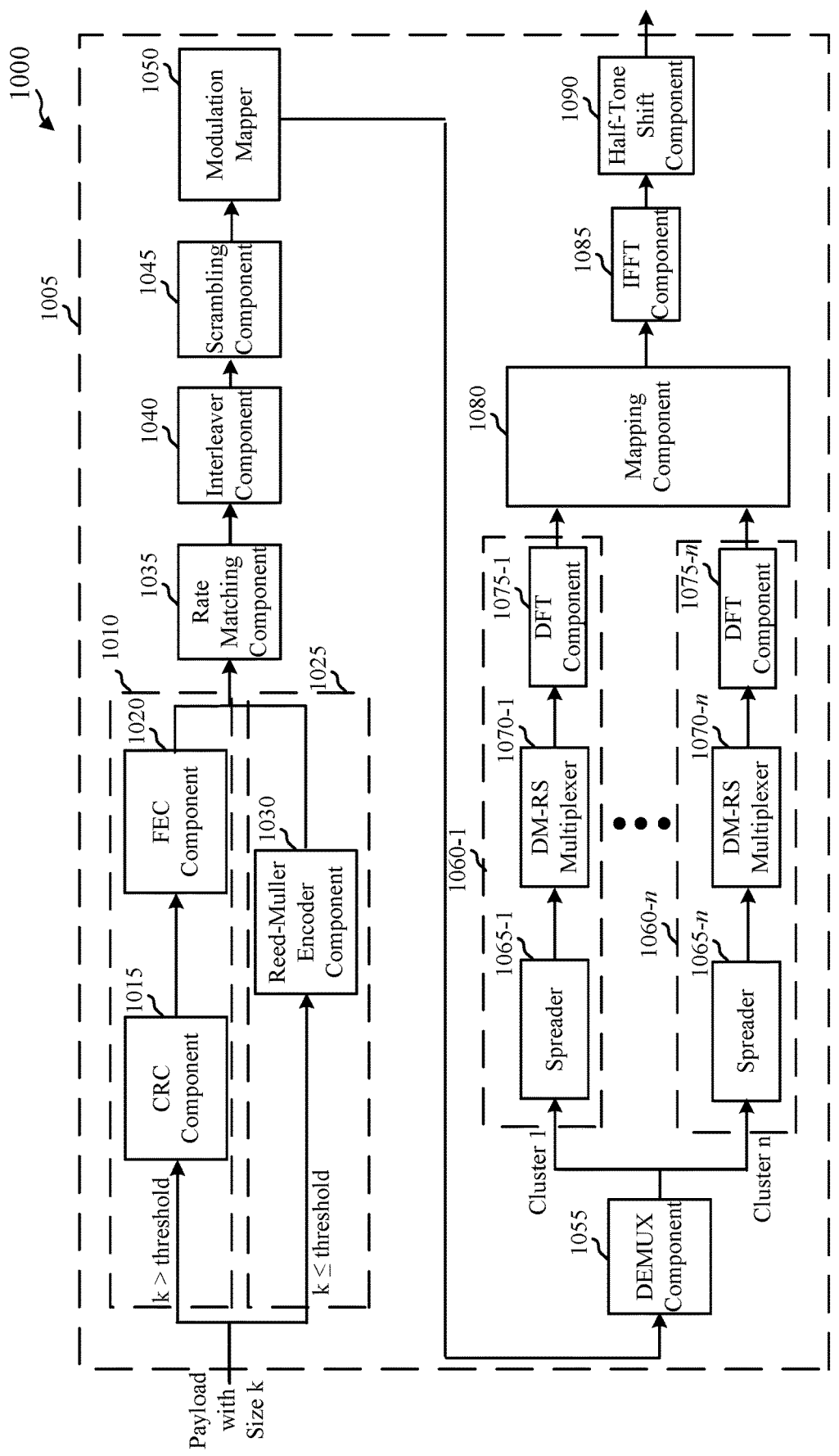
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of one or more aspects of one of the UEs 115 described with reference to FIG. 1 and/or the UEs 215 described with reference to FIG. 2. In some examples, the apparatus 1005 may be an example of the wireless communications management component 420 of FIG. 4. The apparatus 1005 may also be a processor.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. The memory may be an on-board memory, a separate memory, or a combination thereof The apparatus 1005, in examples, may receive a payload having a payload size k. In some examples, the payload may include control channel data, such as acknowledgment and negative acknowledgment information related to data received at the apparatus 1005. In examples that utilize unlicensed radio frequency spectrum band, it may be possible that the apparatus 1005 may accumulate such control channel data for a number of different receptions, because the apparatus 1005 may not be able to transmit uplink transmissions for multiple gating periods due to the unlicensed radio frequency spectrum band being occupied by other users of the unlicensed radio frequency spectrum band. In some examples, the apparatus 1005 may determine the payload size of the payload and perform encoding based on the payload size.

In the example of FIG. 10, it is determined if the payload size k is greater than or less than or equal to a threshold value. If the value of k is greater than the threshold, encoding may proceed along a first branch 1010, and if the value of k is less than or equal to the threshold encoding may proceed along a second branch 1025. In the example of FIG. 10, if the payload size k is greater than the threshold, the first branch 1010 may include a cyclic redundancy check (CRC) component 1015 that may calculate a value for a CRC based on content of the payload and append the CRC value to the payload. The data may then be encoded with a forward error correction (FEC) code, such as a tail-biting convolutional code, at an FEC component 1020. If the payload size k is less than or equal to the threshold value, the encoding may proceed along the second branch 1025, which may include a Reed-Muller encoder component 1030. Following the encoding along either the first branch 1010 or the second branch 1025, a rate matching component 1035 may match the block size of the data to the radio frames to be transmitted. An interleaver component 1040 may interleave the data to provide additional frequency diversity, and a scrambling component 1045 may scramble the data. A modulation mapper 1050 may map the data according to a modulation scheme, such as QPSK for example.

Following modulation mapping, a demultiplexing (DE-MUX) component 1055 may demultiplex the data stream according to the RBs that are allocated for the uplink transmission. Similarly as above, for example, an uplink transmission may have one or more interlaces comprised of a number of non-contiguous RBs, and the demultiplexing component 1055 may provide one or more demultiplexed data streams for the number of allocated RBs. The demultiplexed data streams in this example may include data streams to be used in SC-FDMA uplink transmissions, and each data stream may be provided to a respective cluster processing component 1060-1 through 1060-$n$, where n may be an integer greater than 1. In some examples, there are ten parallel cluster processing components 1060 that process and perform DFT on the demultiplexed data streams. Within each cluster processing component 1060, the data may be processed by a spreader 1065 that may spread the data according to, for example, Chu sequence spreading. Each data stream may be processed by a DM-RS multiplexer 1070 for multiplexing with a DM-RS. A DFT component 1075 may then perform a DFT for the associated data stream. Each of the cluster processing components 1060 may output the data stream and the DM-RS to a mapping component 1080 which may map the data streams and the DM-RS onto REs associated with each of the number of allocated RBs. Following the mapping of the data streams and the DM-RS onto REs for each of the allocated RBs, an inverse fast Fourier transform (IFFT) component 1085 may perform an IFFT on the data stream and the DM-RS, and provide the transformed data stream and DM-RS to a half-tone shift component 1090 that may shift the frequency shift the data stream by a half-tone and provide the output to a transmitter component (e.g., transmitter component 430 of FIG. 4).

While the examples of FIGS. 3-10 are related to uplink shared or control channels, various examples may also provide processing for PRACH uplink transmissions. In some examples, PRACH uplink transmissions may be transmitted in an uplink CCA-exempt transmission (U-CET), and may also be transmitted in other configured resources, such as PRACH resources defined within radio frames, subframes, symbols, and/or interlaces. In some examples, PRACH transmissions may be RB interleaved in an SC-FDMA transmission with formats similar to PUCCH formats 3 or 2/2a/2b as defined according to the LTE/LTE-A protocols.

Figure 11:
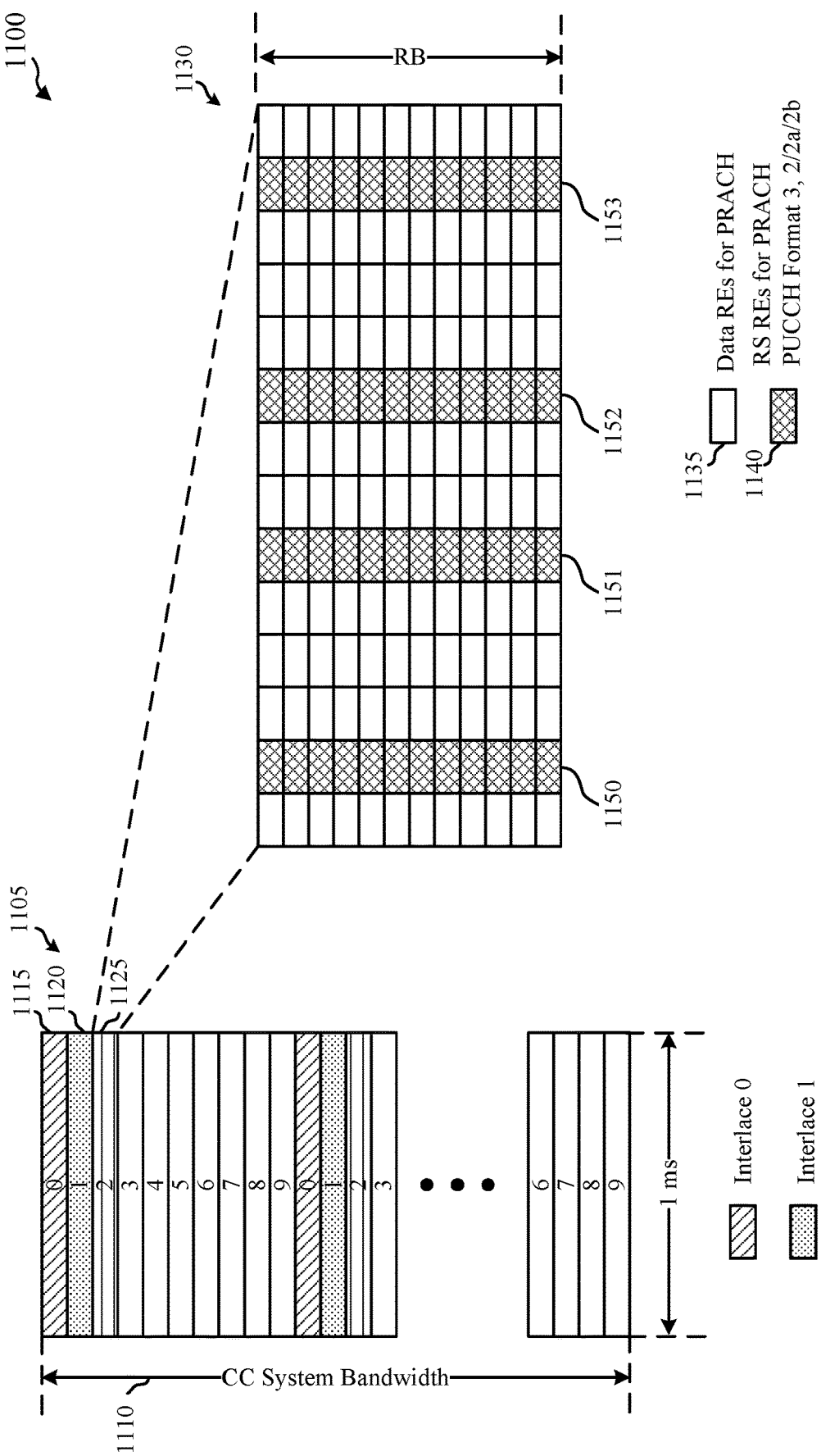
FIG. 11 shows an example of a subframe and associated wireless resources of a resource block of a physical random access channel (PRACH), in accordance with various aspects of the present disclosure.

FIG. 11 shows an example 1100 of a subframe 1105 and associated wireless resources of a resource block 1130 of a physical random access channel (PRACH), in accordance with various aspects of the present disclosure. Subframe 1105 may be transmitted, for example, in an uplink transmission from a UE, such as the UEs 115 of FIG. 1 and/or the UEs 215 of FIG. 2. In this example, a one millisecond subframe 1105 includes a number of RBs that may provide uplink transmission resources that span the component carrier (CC) system bandwidth 1110. These multiple resource blocks may include interlaces, such as first interlace of RBs 1115, second interlace of RBs 1120, and third interlace of RBs 1125. Similarly as discussed above, the RBs, such as interlaces of RBs 1115, 1120 and 1125, for an uplink transmission may be allocated in such a manner that resource blocks 1130 span at least 80% of the available CC system bandwidth 1110.

According to some examples, each resource block of the first interlace of RBs 1115, the second interlace of RBs 1120, or the third interlace of RBs 1125, such as resource block 1130 may include data for a PRACH. In the example of FIG. 11, the third interlace of RBs 1125 may include PRACH resource block 1130 having a format similar to PUCCH format 3, or a format similar to PUCCH 2/2a/2b as defined by the LTE/LTE-A protocols. As illustrated in FIG. 11, a second symbol 1150, a sixth symbol 1151, a ninth symbol 1152, and a thirteenth symbol 1153 of the resource block 1130 may include RS REs 1140 for the PRACH, and the remaining symbols may include data REs 1135 for the PRACH.

In some examples, random access requests from a UE may be transmitted in uplink resources that may be used for initiating a random access procedure. In existing LTE/LTE-A protocol specifications, the PRACH may have contiguous RBs, and a random access request may not allow a UE to specifically identify itself, but the UE may pick an identification sequence according to a Chu sequence (or Zadoff-Chu sequence). In uplink transmissions using an unlicensed radio frequency spectrum band, such as described herein, the interleaving structure of RBs in uplink transmission may result in non-contiguous RBs. In some examples, a UE transmitting using the unlicensed radio frequency spectrum band may pick a resource on which to transmit the random access request according to, for example, a Chu sequence, and the payload of the resource may include an identification of the UE. In some examples, up to 12 PRACH may be allowed per cluster, with 12 tones in each RB, each with a different offset of the true sequence. In such a manner, the PRACH resource may be identified by the cluster index and Chu sequence offset. In some examples, each PRACH may have 200 code bits, with 10 symbols per RB and 10 RBs per cluster. Modulation may be performed using two bit QPSK.

Figure 12:
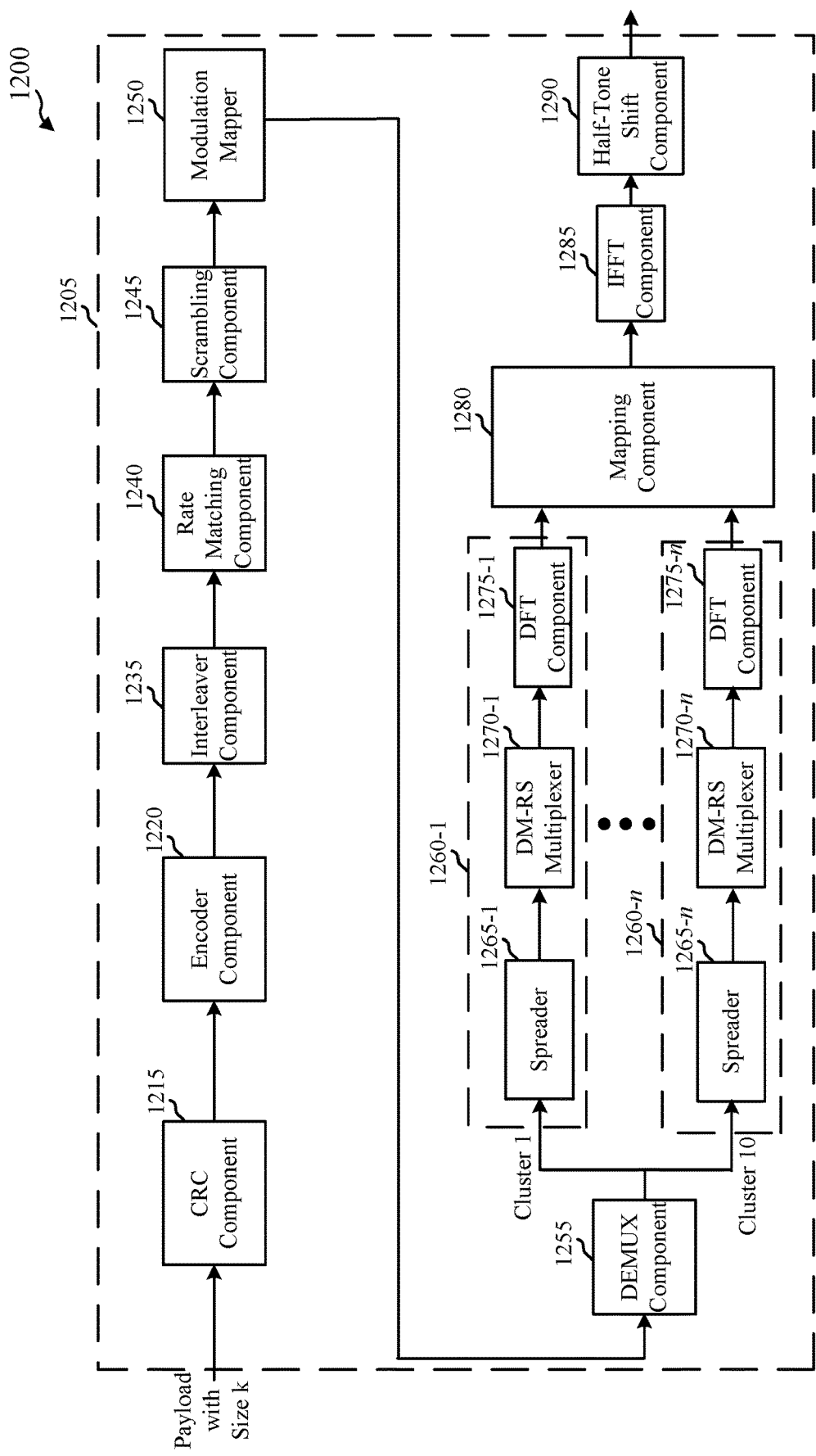
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of one or more aspects of one of the UEs 115 described with reference to FIG. 1 and/or the UEs 215 described with reference to FIG. 2. In some examples, the apparatus 1205 may be an example of wireless communications management component 420 of FIG. 4. The apparatus 1205 may also be a processor.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. The memory may be an on-board memory, a separate memory, or a combination thereof.

The apparatus 1205, in examples, may prepare a random access request to be transmitted on the PRACH in accordance with various techniques described herein. In the example of FIG. 12, the apparatus 1205 may receive a payload having a payload size k. In some examples, the payload may include random access request data, such as discussed above.

In the example of FIG. 12, the payload may be provided to a CRC component 1215 that may calculate a value for a CRC based on content of the payload and append the CRC value to the payload. The data may then be encoded at encoder component 1220, such as with a tail biting convolutional code or a turbo code, for example. Following the encoding, interleaver component 1235 may interleave the data to provide additional frequency diversity, and a rate matching component 1240 may match the block size of the data to the radio frames to be transmitted. A scrambling component 1245 may scramble the data. A modulation mapper 1250 may map the data according to a modulation scheme, such as QPSK for example.

Following modulation mapping, a demultiplexing (DE-MUX) component 1255 may demultiplex the data stream according to the RBs that are allocated for the uplink transmission. Similarly as above, for example, an uplink transmission may have a number of allocated RBs, and the demultiplexing component 1255 may provide one or more demultiplexed data streams for the number of allocated RBs. The demultiplexed data streams in this example may include data streams to be used in SC-FDMA uplink transmissions, and each data stream may be provided to a respective cluster processing component 1260-1 through 1260-n. In some examples, there are ten parallel cluster processing components 1260 that process and perform DFT on the demultiplexed data streams. Within each cluster processing component 1260, the data may be processed by a spreader 1265 that may spread the data according to, for example, Chu sequence spreading. Each data stream may be processed by a DM-RS multiplexer 1270 for incorporation of a DM-RS. A DFT component 1275 may then perform a DFT for the associated data stream. Each of the cluster processing components 1260 may output the data stream and the DM-RS to a mapping component 1280 which may map the data streams and the DM-RS onto REs associated with each of the number of allocated RBs. Following the mapping of the data streams the DM-RS onto REs for each of the allocated RBs, an IFFT component 1285 may perform an IFFT on the data stream the DM-RS, and provide the transformed data stream and DM-RS to a half-tone shift component 1290 that may shift the frequency shift the data stream by a half-tone and provide the output to a transmitter component (e.g., transmitter component 430 of FIG. 4).

As discussed above, in some examples multiple channels may be transmitted according to various techniques. In some examples, the PUSCH, PUCCH, PRACH may be multiplexed within a same subframe. For example, the different channels may be frequency division multiplexed with a same subframe, and the PUSCH, PUCCH, and PRACH may be transmitted using separate clusters, each of which may include one or more separate allocated RBs. In some examples, a single type of channel (e.g., PUSCH, PUCCH, or PRACH) may be transmitted in a single cluster. In some examples, the types of channels that may be transmitted in a subframe may be identified, such as, for example, the PUCCH may be transmitted during a first uplink subframe following successful channel contention. Such a restriction on the PUCCH may help avoid blocking PUSCH transmissions, and may also help avoid PUCCH transmissions being blocked by PUSCH transmissions. For example, the PUCCH may include one or more clusters in a first uplink subframe of a radio frame. Similarly, in some examples, the PRACH may include one or more clusters in the first uplink subframe of a radio frame. Thus, the available clusters for the PUSCH in the first uplink subframe may be reduced relative to PUSCH clusters in subsequent uplink subframes of a radio frame.

In some examples, a UE (e.g., UE 115 and/or 215 of FIG. 1 and/or 2) may receive signaling indicating the clusters/interlaces of RBs available for transmission of the PRACH and PUCCH. Such signaling may dynamically set available clusters for different channels via, for example, uplink grants in radio resource control (RRC) signaling. For example, a UE may receive separate PUSCH grants for first uplink subframe and for subsequent uplink subframes. In other examples, a UE may receive a same grant for both the first uplink subframe and subsequent uplink subframes with an implicit indication or rule that provides that the UE will know which cluster/interlace of RBs will be reserved for PUCCH/PRACH. In other examples, signaling may be transmitted to the UE through MAC layer signaling. In still further examples, signaling may semi-statically indicate which subframes may include transmissions for the PUCCH/PRACH such as through a system information block (SIB). In still further examples, available subframes for PUCCH/PRACH may be set according to a standard. Even in subframes that include PUCCH and/or PRACH transmissions, PUSCH transmissions may be rate matched around clusters used by the PUCCH and/or PRACH.

Figure 13:
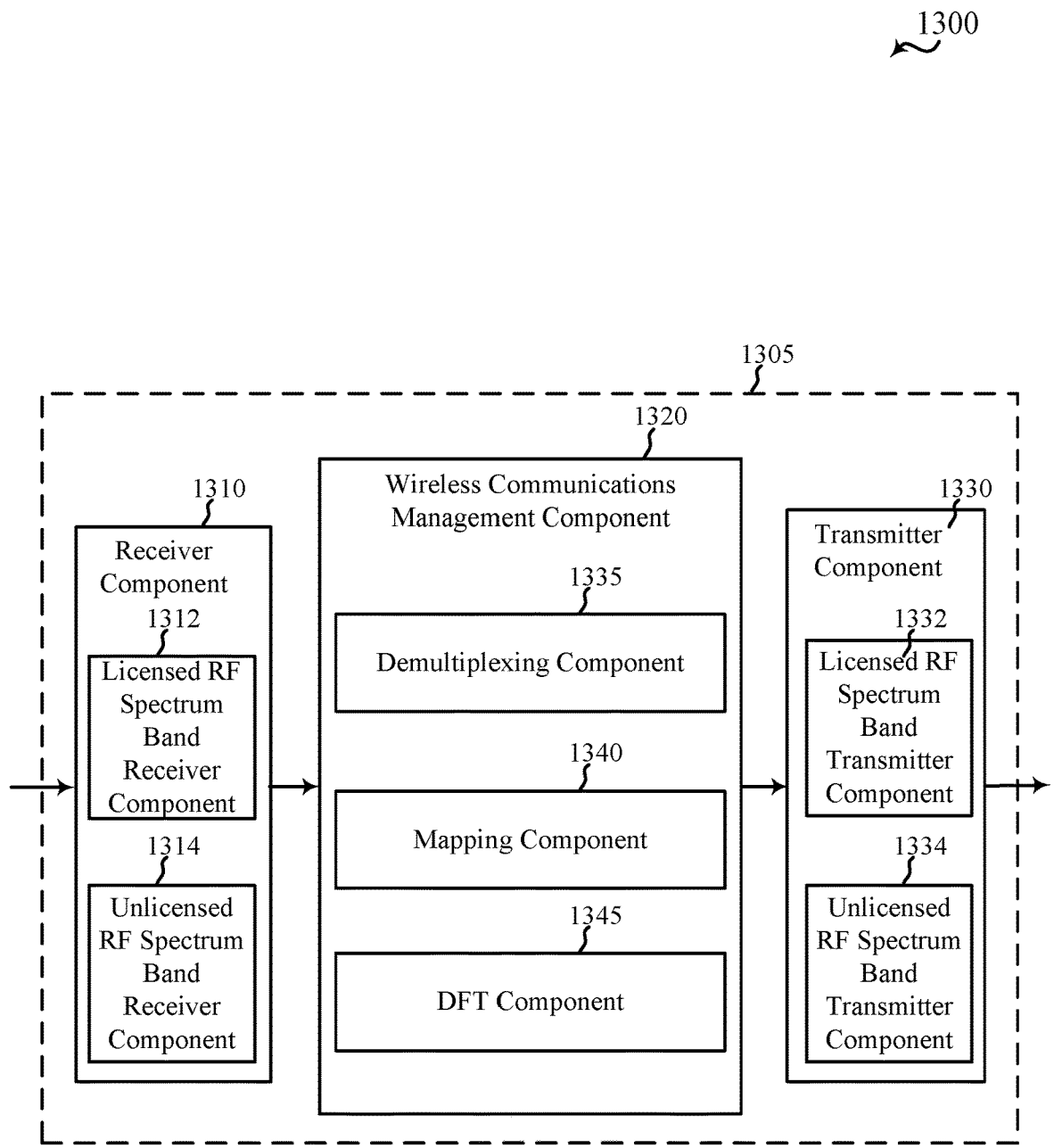
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. The apparatus 1305 may be an example of one or more aspects of a UE 115 and/or 215 described with reference to FIGS. 1 and/or 2. The apparatus 1305 also may be an example of apparatus 405 of FIG. 4. The apparatus 1305 may include a receiver component 1310, a wireless communications management component 1320, and/or a transmitter component 1330. The apparatus 1305 may also be or include a processor (not shown). Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. The memory may be an on-board memory, a separate memory, or a combination thereof.

The receiver component 1310 may receive information such as packets, user data, and/or control information associated with various information channels (e.g., control channels, data channels, etc.). The receiver component 1310 may be configured to receive transmissions over one or more radio frequency spectrum bands, including both licensed radio frequency spectrum bands and unlicensed radio frequency spectrum bands. Licensed radio frequency (RF) spectrum band receiver component 1312 may be used, in this example, to receive communications over the licensed radio frequency spectrum band. Unlicensed RF spectrum band receiver component 1314 may be used, in this example, to receive communications over the unlicensed radio frequency spectrum band. Information may be passed on to the wireless communications management component 1320, and to other components of the apparatus 1305.

According to some examples, the wireless communications management component 1320 may include components that provide signal processing and such as described with respect to FIGS. 5-12. Such components may include, for example, a demultiplexing component 1335, which may be an example of demultiplexing components 515, 615, 815, 1055, and/or 1255 of FIG. 5, 6, 8, 10, and/or 12. The wireless communications management component 1320 also may include a mapping component 1340, which may be an example of mapping component 525, 625, 825, 1080, and/or 1280 of FIG. 5, 6, 8, 10, and/or 12. The wireless communications management component 1320 may optionally include a DFT component 1345, which may be an example of DFT components 5201-n, 6201-n, 1075, and/or 1275 of FIG. 5, 6, 10, and/or 12.

The transmitter component 1330 may transmit the one or more signals received from other components of the apparatus 1305. The transmitter component 1330 may transmit, for example, interlaced resource blocks using a shared radio frequency spectrum band, and/or may transmit using a licensed radio frequency spectrum band. Licensed RF spectrum band transmitter component 1332 may be used, in this example, to transmit communications over the licensed radio frequency spectrum band. Unlicensed RF spectrum band transmitter component 1334 may be used, in this example, to transmit communications over the unlicensed radio frequency spectrum band. In some examples, the transmitter component 1330 may be collocated with the receiver component 1310 in a transceiver component.

Figure 14:
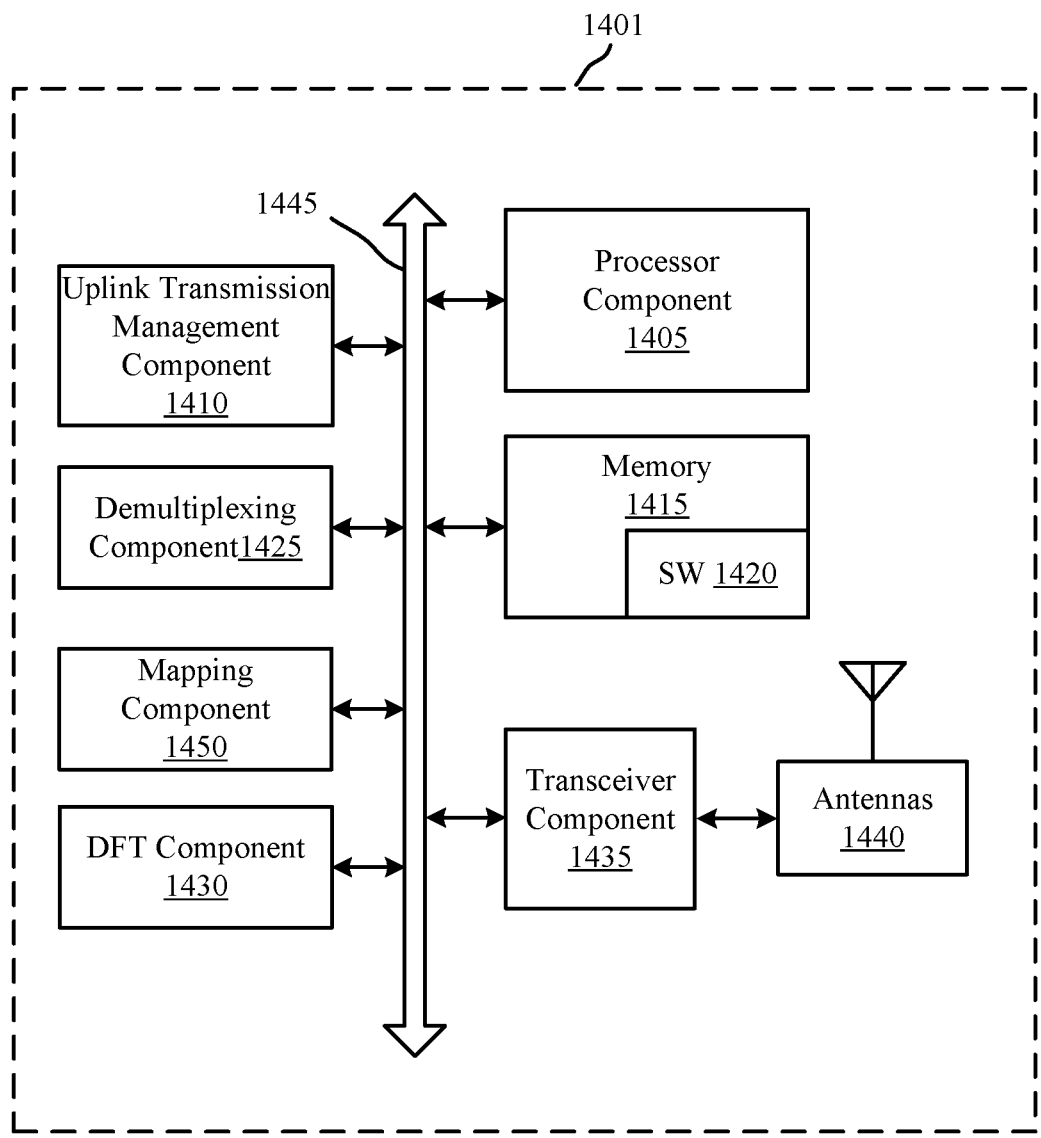
FIG. 14 shows a system for use in wireless communication, in accordance with various aspects of the present disclosure.

FIG. 14 shows a system 1400 for use in wireless communication, in accordance with various aspects of the present disclosure. System 1400 may include a UE 1401, which may be an example of the UEs 115 and/or 215 of FIGS. 1 and/or 2. UE 1401 may also be an example of one or more aspects of apparatus 405, 505, 605, 805, 1205, and/or 1305 of FIGS. 4, 5, 6, 8, 12, and/or 13.

The UE 1401 may include components for bi-directional voice and data communications including components for transmitting communications and components for receiving communications. The UE 1401 may include antenna(s) 1440, a transceiver component 1435, a processor component 1405, and memory 1415 (including software (SW) 1420), which each may communicate, directly or indirectly, with each other (e.g., via one or more buses 1445). The memory 1415 may be an on-board memory, a separate memory, or a combination thereof. The transceiver component 1435 may be configured to communicate bi-directionally, via the antenna(s) 1440 and/or one or more wired or wireless links, with one or more networks, as described above. For example, the transceiver component 1435 may be configured to communicate bi-directionally with base stations 105 and/or 205 with reference to FIGS. 1 and/or 2. The transceiver component 1435 may include a modem configured to modulate the packets and provide the modulated packets to the antenna(s) 1440 for transmission, and to demodulate packets received from the antenna(s) 1440. The UE may have multiple antennas 1440 capable of concurrently transmitting and/or receiving multiple wireless transmissions. The transceiver component 1435 may be capable of concurrently communicating with one or more base stations 105 via multiple component carriers.

The UE 1401 may include an uplink transmission management component 1410, which may perform the functions described above for the determination of interlaces/clusters of RBs for transmission using one or more uplink channels, such as the PUSCH, PUCCH, and/or PRACH. The UE 1401 may also include a demultiplexing component 1425, which may perform the functions described above for demultiplexing a data stream. The UE 1401 may also include a mapping component 1450, which may perform the functions described above for mapping demultiplexed data streams. The UE 1401 may also include a DFT component 1430, which may perform the DFT functions described above.

In various examples, the uplink transmission management component 1410, the demultiplexing component 1425, the mapping component 1450, and/or the DFT component 1430 may, individually or collectively, be implemented using one or more ASICs adapted to perform some or all of the applicable functions in hardware. Alternatively, the functions may be performed by one or more other processing units (or cores), on one or more integrated circuits which may, in some examples, form at least part of the processor component 1405. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, such as the memory 1415, formatted to be executed by one or more general or application-specific processors, which may, in some examples, form at least part of the processor component 1405.

The memory 1415 may include random access memory (RAM) and read-only memory (ROM). The memory 1415 may store computer-readable, computer-executable software/firmware code 1420 containing instructions that are configured to, when executed, cause the processor component 1405 to perform various functions described herein (e.g., demultiplexing a data stream, mapping the demultiplexed data streams to resource elements, etc.). Alternatively, the computer-readable, computer-executable software/firmware code 1420 may not be directly executable by the processor component 1405 but be configured to cause a computer (e.g., when compiled and executed) to perform functions described herein. The processor component 1405 may include an intelligent hardware device, e.g., a central processing unit (CPU), a microcontroller, an ASIC, etc.

Figure 15:
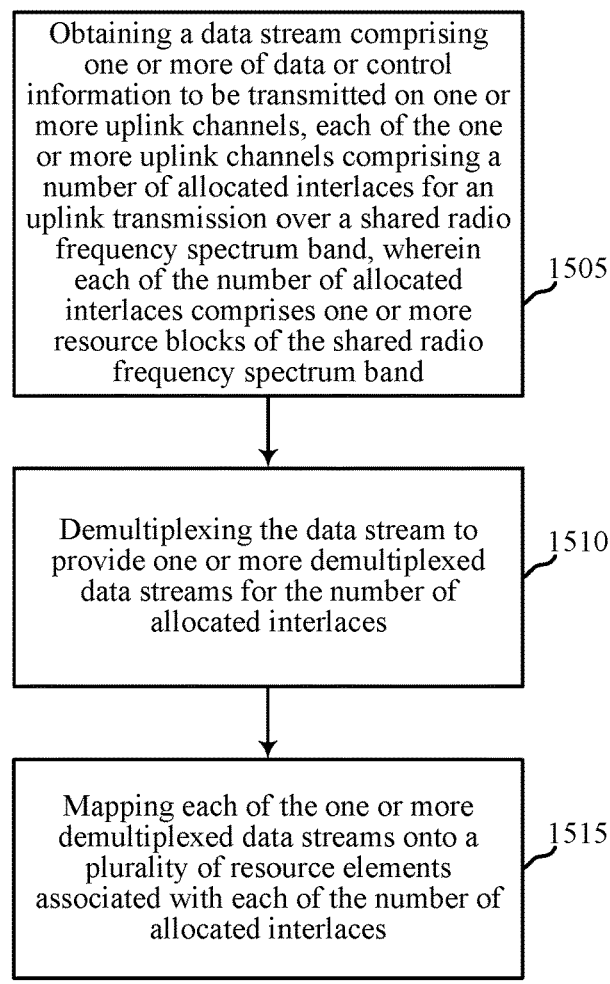
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, and/or 1401 described with reference to FIGS. 1, 2, and/or 14, and/or aspects of one or more of the devices or apparatuses 405, 505, 605, 805, 1005, 1205, and/or 1305 described with reference to FIGS. 4, 5, 6, 8, 10, 12, and/or 13. In some examples, a UE may execute one or more sets of codes to control the functional elements of the UE to perform the functions described below. Additionally or alternatively, the UE may perform one or more of the functions described below using special-purpose hardware.

At block 1505, the UE may obtain a data stream comprising one or more of data or control information to be transmitted on one or more uplink channels, each of the one or more uplink channels comprising a number of allocated interlaces for an uplink transmission over a shared radio frequency spectrum band, wherein each of the number of allocated interlaces comprises one or more resource blocks of the shared radio frequency spectrum band.

The operation(s) at block 1505 may be performed using the data stream component 410 of FIG. 4, the transport block processing components 510, 610, and/or 810 of FIGS. 5, 6, and/or 8, the CRC component 1015 and/or 1215 of FIGS. 10 and/or 12, the Reed-Muller encoder component 1030 of FIG. 10, and/or the uplink transmission management component 1410 of FIG. 14.

At block 1510, the UE may demultiplex the data stream to provide one or more demultiplexed data streams for the number of allocated interlaces. The operation(s) at block 1510 may be performed using the wireless communications management component 420 of FIG. 4, and/or the demultiplexing components 515, 615, 815, 1055, 1255, 1335 and/or 1425 of FIG. 5, 6, 8, 10, 12, 13, and/or 14.

At block 1515, the UE may map each of the one or more demultiplexed data streams onto a plurality of resource elements associated with each of the number of allocated interlaces. The operation(s) at block 1515 may be performed using the wireless communications management component 420 of FIG. 4, and/or the mapping components 525, 625, 825, 1080, 1280, 1340, and/or 1450 of FIG. 5, 6, 8, 10, 12, 13, and/or 14.

Thus, the method 1500 may provide for wireless communication. It should be noted that the method 1500 is just one implementation and that the operations of the method 1500 may be rearranged or otherwise modified such that other implementations are possible.

Figure 16:
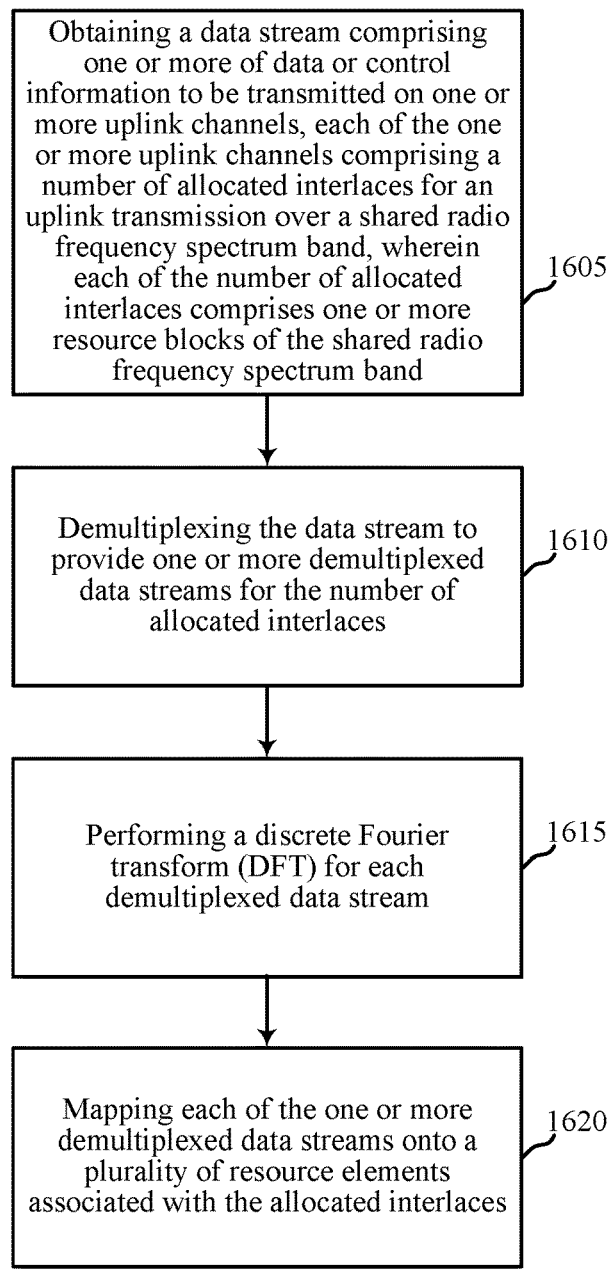
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 215, and/or 1401 described with reference to FIGS. 1, 2, and/or 14, and/or aspects of one or more of the devices or apparatuses 405, 505, 605, 805, 1005, 1205, and/or 1305 described with reference to FIGS. 4, 5, 6, 8, 10, 12, and/or 13. In some examples, a UE may execute one or more sets of codes to control the functional elements of the UE to perform the functions described below. Additionally or alternatively, the UE may perform one or more of the functions described below using special-purpose hardware.

At block 1605, the UE may obtain a data stream comprising data to be transmitted on one or more uplink channels, each of the one or more uplink channels comprising a number of allocated interlaces for an uplink transmission over a shared radio frequency spectrum band, wherein each of the number of allocated interlaces comprises one or more resource blocks of the shared radio frequency spectrum band.

The operation(s) at block 1605 may be performed using the data stream component 410 of FIG. 4, the transport block processing components 510, and/or 610 of FIGS. 5, and/or 6, the CRC component 1015 and/or 1215 of FIGS. 10 and/or 12, the Reed-Muller encoder component 1030 of FIG. 10, and/or the uplink transmission management component 1410 of FIG. 14.

At block 1610, the UE may demultiplex the data stream to provide one or more demultiplexed data streams for the number of allocated interlaces. The operation(s) at block 1610 may be performed using the wireless communications management component 420 of FIG. 4, and/or the demultiplexing components 515, 615, 1055, 1255, 1335 and/or 1425 of FIG. 5, 6, 10, 12, 13, and/or 14.

At block 1615, the UE may perform a discrete Fourier transform (DFT) for each demultiplexed data stream. The operation(s) at block 1615 may be performed using the wireless communications management component 420 of FIG. 4, and/or the DFT components 5201-n, 620, 1075, 1275, 1345, and/or 1430 of FIG. 5, 6, 10, 12, 13, and/or 14.

At block 1620, the UE may map each of the one or more demultiplexed data streams onto a plurality of resource elements associated with the allocated interlaces. The operation(s) at block 1620 may be performed using the wireless communications management component 420 of FIG. 4, and/or the mapping components 525, 625, 1080, 1280, 1340, and/or 1450 of FIG. 5, 6, 10, 12, 13, and/or 14.

Thus, the method 1600 may provide for wireless communication. It should be noted that the method 1600 is just one implementation and that the operations of the method 1600 may be rearranged or otherwise modified such that other implementations are possible.

Figure 17:
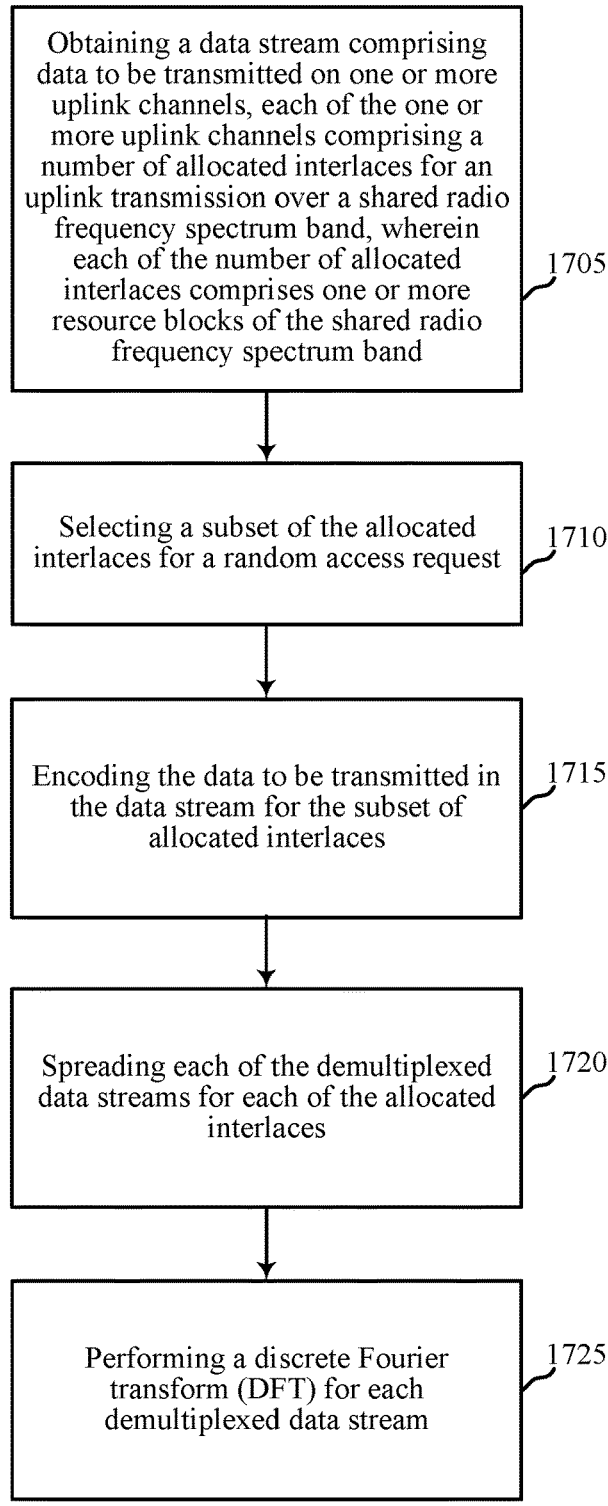
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, 215, and/or 1401 described with reference to FIGS. 1, 2, and/or 14, and/or aspects of one or more of the devices or apparatuses 405, 1205, and/or 1305 described with reference to FIGS. 4, 12, and/or 13. In some examples, a UE may execute one or more sets of codes to control the functional elements of the UE to perform the functions described below. Additionally or alternatively, the UE may perform one or more of the functions described below using special-purpose hardware.

At block 1705, the UE may obtain a data stream comprising data to be transmitted on one or more uplink channels, each of the one or more uplink channels comprising a number of allocated interlaces for an uplink transmission over a shared radio frequency spectrum band, wherein each of the number of allocated interlaces comprises one or more resource blocks of the shared radio frequency spectrum band.

The operation(s) at block 1705 may be performed using the data stream component 410 of FIG. 4, the CRC component 1215 of FIG. 12, the wireless communications management component 1320 of FIG. 13, and/or the uplink transmission management component 1410 of FIG. 14.

At block 1710, the UE may select a subset of the allocated interlaces for a random access request. The operation(s) at block 1710 may be performed using the wireless communications management components 420 and/or 1320 of FIG. 4 and/or 13, and/or the uplink transmission management component 1410 of FIG. 14.

At block 1715, the UE may encode the data to be transmitted into the data stream for the subset of allocated interlaces. The operation(s) at block 1715 may be performed using the wireless communications management component 420 and/or 1320 of FIG. 4 and/or 13, the encoder component 1220 of FIG. 12, and/or the uplink transmission management component 1410 of FIG. 14.

At block 1720, the UE may spread each of the demultiplexed data streams for each allocated interlace. The operation(s) at block 1720 may be performed using the wireless communications management component 420 of FIG. 4, the wireless communications management component 1320 of FIG. 13, the spreader 1265 of FIG. 12, and/or the uplink transmission management component 1410 of FIG. 14.

At block 1725, the UE may perform a discrete Fourier transform (DFT) for each demultiplexed data stream. The operation(s) at block 1725 may be performed using the wireless communications management component 420 and/or 1320 of FIG. 4 and/or 13, the DFT components 1275 of FIG. 12, and/or the DFT component 1430 of FIG. 14.

Thus, the method 1700 may provide for wireless communication. It should be noted that the method 1700 is just one implementation and that the operations of the method 1700 may be rearranged or otherwise modified such that other implementations are possible.

In some examples, aspects from two or more of the methods 1500, 1600, and/or 1700 may be combined. It should be noted that the methods 1500, 1600, and 1700 are just example implementations, and that the operations of the methods 1500-1700 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the present disclosure. These techniques, however, may be practiced without these specific details. In some instances, well-known structures and apparatuses are shown in block diagram form in order to avoid obscuring the concepts of the present disclosure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying an available bandwidth of a frequency spectrum;
   obtaining a stream comprising information to be transmitted on one or more interlaces, of a set of interlaces, allocated for uplink transmission over the frequency spectrum, wherein, during a time interval, each of the one or more interlaces comprises a plurality of resource blocks that are non-contiguous in the frequency domain; and
   mapping the information of the stream onto a plurality of resource elements associated with the plurality of resource blocks of the one or more interlaces.

2. The method of claim 1, wherein the one or more interlaces allocated for uplink transmission comprise a plurality of interlaces, and wherein respective resource blocks of a first interlace of the plurality of interlaces are non-contiguous in the frequency domain with respective resource blocks of a second interlace of the plurality of interlaces.

3. The method of claim 1, wherein the one or more interlaces allocated for uplink transmission comprise a plurality of interlaces, and wherein respective resource blocks of a first interlace of the plurality of interlaces are contiguous in the frequency domain with respective resource blocks of a second interlace of the plurality of interlaces.

4. The method of claim 1, wherein the one or more interlaces allocated for uplink transmission are associated with a physical uplink shared channel (PUSCH).

5. The method of claim 1, wherein the stream comprises a plurality of modulation symbols.

6. The method of claim 1, wherein the respective resource blocks of each of the one or more interlaces span at least 80% of the available bandwidth.

7. The method of claim 1, further comprising:
   transmitting the information via a signal comprising the plurality of resource elements associated with the resource blocks of the one or more interlaces.

8. The method of claim 1, further comprising:
   transmitting the plurality of resource elements using single carrier frequency division multiple access (SC-FDMA) techniques.

9. The method of claim 1, further comprising:
   transmitting the plurality of resource elements using orthogonal frequency division multiple access (OFDMA) techniques.

10. An apparatus for wireless communication, comprising:
    a processor,
    memory in electronic communication with the processor, and
    instructions stored in the memory and executable by the processor to cause the apparatus to: identify an available bandwidth of a frequency spectrum; obtain a stream comprising information to be transmitted on one or more interlaces, of a set of interlaces, allocated for uplink transmission over the frequency spectrum, wherein, during a time interval, each of the one or more interlaces comprises a plurality of resource blocks that are non-contiguous in the frequency domain; and map the information of the stream onto a plurality of resource elements associated with the plurality of resource blocks of the one or more interlaces.

11. The apparatus of claim 10, wherein the one or more interlaces allocated for uplink transmission comprise a plurality of interlaces, and wherein respective resource blocks of a first interlace of the plurality of interlaces are non-contiguous in the frequency domain with respective resource blocks of a second interlace of the plurality of interlaces.

12. The apparatus of claim 10, wherein the one or more interlaces allocated for uplink transmission comprise a plurality of interlaces, and wherein respective resource blocks of a first interlace of the plurality of interlaces are contiguous in the frequency domain with respective resource blocks of a second interlace of the plurality of interlaces.

13. The apparatus of claim 10, wherein the one or more interlaces allocated for uplink transmission are associated with a physical uplink shared channel (PUSCH).

14. The apparatus of claim 10, wherein the stream comprises a plurality of modulation symbols.

15. The apparatus of claim 10, wherein the respective resource blocks of each of the one or more interlaces span at least 80% of the available bandwidth.

16. The apparatus of claim 10, wherein the instructions are further executable by the processor to cause the apparatus to:
transmit the information via a signal comprising the plurality of resource elements associated with the resource blocks of the one or more interlaces.

17. The apparatus of claim 10, wherein the instructions are further executable by the processor to cause the apparatus to:
transmit the plurality of resource elements using single carrier frequency division multiple access (SC-FDMA) techniques.

18. The apparatus of claim 10, wherein the instructions are further executable by the processor to cause the apparatus to:
transmit the plurality of resource elements using orthogonal frequency division multiple access (OFDMA) techniques.

19. An apparatus for wireless communication, comprising:
means for identifying an available bandwidth of a frequency spectrum;
means for obtaining a stream comprising information to be transmitted on one or more interlaces, of a set of interlaces, allocated for uplink transmission over the frequency spectrum, wherein, during a time interval, each of the one or more interlaces comprises a plurality of resource blocks that are non-contiguous in the frequency domain; and
means for mapping the information of the stream onto a plurality of resource elements associated with the plurality of resource blocks of the one or more interlaces.

20. The apparatus of claim 19, wherein the one or more interlaces allocated for uplink transmission comprise a plurality of interlaces, and wherein respective resource blocks of a first interlace of the plurality of interlaces are non-contiguous in the frequency domain with respective resource blocks of a second interlace of the plurality of interlaces.

21. The apparatus of claim 19, wherein the one or more interlaces allocated for uplink transmission comprise a plurality of interlaces, and wherein respective resource blocks of a first interlace of the plurality of interlaces are contiguous in the frequency domain with respective resource blocks of a second interlace of the plurality of interlaces.

22. The apparatus of claim 19, wherein the one or more interlaces allocated for uplink transmission are associated with a physical uplink shared channel (PUSCH).

23. The apparatus of claim 19, wherein the stream comprises a plurality of modulation symbols.

24. The apparatus of claim 19, wherein the respective resource blocks of each of the one or more interlaces span at least 80% of the available bandwidth.

25. The apparatus of claim 19, further comprising:
means for transmitting the information via a signal comprising the plurality of resource elements associated with the resource blocks of the one or more interlaces.

26. The apparatus of claim 19, further comprising:
means for transmitting the plurality of resource elements using single carrier frequency division multiple access (SC-FDMA) techniques.

27. The apparatus of claim 19, further comprising:
means for transmitting the plurality of resource elements using orthogonal frequency division multiple access (OFDMA) techniques.

28. A non-transitory computer-readable medium storing code for wireless communication, the code comprising instructions executable by a processor to:
identify an available bandwidth of a frequency spectrum;
obtain a stream comprising information to be transmitted on one or more interlaces, of a set of interlaces, allocated for uplink transmission over the frequency spectrum, wherein, during a time interval, each of the one or more interlaces comprises a plurality of resource blocks that are non-contiguous in the frequency domain; and
map the information of the stream onto a plurality of resource elements associated with the plurality of resource blocks of the one or more interlaces.

29. The non-transitory computer-readable medium of claim 28, wherein the one or more interlaces allocated for uplink transmission comprise a plurality of interlaces, and wherein respective resource blocks of a first interlace of the plurality of interlaces are non-contiguous in the frequency domain with respective resource blocks of a second interlace of the plurality of interlaces.

30. The non-transitory computer-readable medium of claim 28, wherein the one or more interlaces allocated for uplink transmission comprise a plurality of interlaces, and wherein respective resource blocks of a first interlace of the plurality of interlaces are contiguous in the frequency domain with respective resource blocks of a second interlace of the plurality of interlaces.

31. The non-transitory computer-readable medium of claim 28, wherein the one or more interlaces allocated for uplink transmission are associated with a physical uplink shared channel (PUSCH).

32. The non-transitory computer-readable medium of claim 28, wherein the stream comprises a plurality of modulation symbols.

33. The non-transitory computer-readable medium of claim 28, wherein the respective resource blocks of each of the one or more interlaces span at least 80% of the available bandwidth.

34. The non-transitory computer-readable medium of claim 28, wherein the instructions are further executable by the processor to:
transmit the information via a signal comprising the plurality of resource elements associated with the resource blocks of the one or more interlaces.

35. The non-transitory computer-readable medium of claim 28, wherein the instructions are further executable by the processor to:
transmit the plurality of resource elements using single carrier frequency division multiple access (SC-FDMA) techniques.

36. The non-transitory computer-readable medium of claim 28, wherein the instructions are further executable by the processor to:
   transmit the plurality of resource elements using orthogonal frequency division multiple access (OFDMA) techniques.

* * * * *